(12) United States Patent
Conrad

(10) Patent No.: US 6,307,358 B1
(45) Date of Patent: Oct. 23, 2001

(54) METHOD AND APPARATUS FOR DELIVERING POWER TO A MECHANICAL OR ELECTRICAL SYSTEM

(75) Inventor: Wayne Ernest Conrad, Hampton (CA)

(73) Assignee: Omachron Technologies, Inc., Katonah, NY (US)

(*) Notice: Subject to any disclaimer, the term of this patent is extended or adjusted under 35 U.S.C. 154(b) by 0 days.

(21) Appl. No.: 09/557,223

(22) Filed: Apr. 25, 2000

(30) Foreign Application Priority Data

| Oct. 15, 1999 | (CA) | 2286413 |
| Oct. 15, 1999 | (CA) | 2286878 |
| Oct. 15, 1999 | (CA) | 2286880 |
| Oct. 15, 1999 | (CA) | 2286881 |
| Oct. 15, 1999 | (CA) | 2286883 |
| Oct. 15, 1999 | (CA) | 2286891 |
| Oct. 15, 1999 | (CA) | 2286892 |
| Apr. 20, 2000 | (CA) | 2306531 |

(51) Int. Cl.⁷ ............................................. G05F 1/40
(52) U.S. Cl. ................................................. 323/282
(58) Field of Search ........................... 323/220, 265, 323/266, 268, 270, 271, 273, 282

(56) References Cited

U.S. PATENT DOCUMENTS

| 4,009,416 |   | 2/1977  | Lowther        | 315/176 |
| 4,376,263 |   | 3/1983  | Pittroff et al.| 320/32  |
| 4,441,147 |   | 4/1984  | Schwarz et al. | 363/21  |
| 5,373,434 | * | 12/1994 | Malik          | 363/56  |
| 5,673,184 | * | 9/1997  | Rilly et al.   | 363/21  |
| 5,747,977 | * | 5/1998  | Hwang          | 323/284 |
| 5,886,880 |   | 3/1999  | Hisanaga       | 363/20  |
| 5,942,858 |   | 8/1999  | Sokolov et al. | 315/246 |
| 5,994,883 | * | 11/1999 | Liu            | 323/237 |
| 6,026,126 | * | 2/2000  | Gaetano        | 375/296 |
| 6,111,230 | * | 8/2000  | Cao et al.     | 219/501 |

* cited by examiner

Primary Examiner—Matthew Nguyen
(74) Attorney, Agent, or Firm—Philip C. Mendes da Costa; Bereskin & Parr

(57) ABSTRACT

A power control system for use in providing mechanical or electrical power to a load is used to operate a system to provide a series of pulses to the system wherein the pulses within each series provide differing amounts of power. Preferably, a portion of the series which has a duration of 10% of the cycle delivers more than 20% of the total power to the load which the load receives each cycle.

18 Claims, 17 Drawing Sheets

METHOD AND APPARATUS FOR DELIVERING POWER TO A MECHANICAL OR ELECTRICAL SYSTEM

FIELD OF THE INVENTION

This invention relates to power control systems and methods of delivering power to a mechanical or a fluid mechanical system. In particular, this invention relates to the use of impulsed power.

BACKGROUND OF THE INVENTION

Power control systems are used to control the rate of delivery of power to a member which requires power or which performs work. For example, power control systems are used to control the delivery of electrical power to a load (eg. a motor or other electromechanical devices which produce work such as solenoids, loudspeakers, florescent lights, incandescent lights and sodium lamps). The load may also be a battery wherein the power control system is used to control the charging and/or the discharging of the battery. Power control systems are also used in mechanical systems such as to control the delivery of power from an internal combustion engine. Examples of power control systems for such mechanical systems include governors and regulators for power generators.

Historically, power control systems have been designed to provide a uniform flow of power. For example, in the case of electrical motors, power delivery systems have been developed so as to ensure a continuous flow of electricity to a motor so that the drive shaft driven by the motor runs at a constant rate of revolution. In this way, the motor operates smoothly (i.e. without any vibrations). Similarly, even in mechanical systems, such as the use of an internal combustion engine to drive a vehicle (e.g. a car, train, airplane or the like), the power control systems have been developed so as to ensure that the engine provides smooth acceleration to the vehicle.

More recently, developments have been directed also towards decreasing the power requirements of a system. Typically, such work has been developed to reduce the actual amount of power required to operate the system while still maintaining a uniform flow of power. Examples of such developments include improved laminations and wiring for motors and generators to reduce power lost as heat.

There are also many applications wherein no power control system is utilized. An example of this is lighting. Fundamentally, an incandescent light bulb has a filament, usually contained within a glass enclosure, filled with a gas selected to maximize filament life. In use, an electric current is passed through the filament and simply serves to heat the filament to a very high temperature. The effect of this is to cause the filament to radiate electromagnetic radiation. It is well known that the spectrum of radiation produced is dependent upon the temperature of the filament. The filament is designed to reach temperatures such that a significant proportion of the radiation falls within the visible band of the electromagnetic spectrum. Unfortunately, the electromagnetic spectrum produced by a heated object, such as a filament, is necessarily broad, and much of the radiation falls either in the infrared or ultraviolet bands. This is highly undesirable. However, conventionally, it has simply been accepted that the physics of radiation or a heated body necessarily determines characteristic. Accordingly, this is simply accepted, and common incandescent light bulbs have a relatively low efficiency.

Similarly, a fluorescent light bulb typically has a gas, eg. mercury vapour, contained within a glass enclosure. In use, an electric current is passed through the mercury vapour to ionize the vapour, This in turn excites a fluorescent coating on the glass, to produce visible light as well as electromagnetic radiation outside the visible spectrum.

Another example are electric motors and other devices which are powered by batteries or cells. Batteries or cells are commonly classified into two types, namely: primary cells, which are single use cells and, after discharge, cannot be recharged for further use; and secondary cells or batteries, which are subjected to a large number of charge and discharge cycles. Commonly, the current or energy drain from a battery or cell, whether this be a primary cell or secondary cell, is determined solely by the characteristics of the load. While there are a number of concepts employing pulse width modulation which are used to control the power consumption of electric motors, these known techniques are directed solely to controlling the motor, without regard to the effect on the energy source, and in particular without regard to any impact on the drain from a battery source.

Secondary batteries or cells deliver a DC current. Accordingly, charging of such secondary cells is commonly done by connection to a suitable, fixed DC potential. Current flow into the cell is then determined by the electrical characteristics of the cell, including the internal resistance of the cell. Practically, when charging the cell, the current initially has a relatively high value, and then reduces down, in some approximate exponential fashion. When a secondary battery is recharged, heat is produced. This heat is a byproduct of the recharging process and constitutes a loss of energy when a battery or cell is recharged. The speed at which a secondary battery or cell can be recharged is generally governed by the temperature to which the battery may be raised without degradation of the battery occurring.

Despite the advances which have been made in recent years in power control systems, a need still exists to increase the energy efficiency of electrical and mechanical devices as well as the speed and efficiency of battery recharging.

SUMMARY OF THE INVENTION

In the research which has been undertaken by the inventor, it has surprisingly been found that the objective of providing a uniform flow of power to a system results in inefficiencies. Various systems operate on a cyclical basis which is not uniform. In accordance to the instant invention, in order to increase the energy efficiency of a system, the power is provided to, or withdrawn from, the system so as to operate a system in a regime in which it operates more efficiently. These systems include transmitting motive force between a fluid and an apparatus (eg. a fan blade or turbine) positioned in the fluid flow path, the production of light and other forms of radiation (including in particular infrared and x-ray radiation) and the charging and discharging of batteries. In each of these systems, the input of power results in the creation of work (eg. a fluid is moved, radiation is produced, electricity is generated or a battery is charged). However, the systems perform more work than is required. For example, in the case of light bulbs, lights bulbs will emit light (visible radiation), as well as radiation in band widths which are not visible (ancillary work). By reducing the non-visible radiation emitted by a light bulb, the same amount of visible light may be produced using less power. By providing pulsed power to the system, the system may be driven to perform the required work (eg. the production of light) and at least a reduced amount of ancillary work (eg. the production of non-visible radiation).

In accordance with the instant invention, a method of controlling the electrical power applied to a load comprises the steps of producing a pulse train comprising a series of pulses defining a cycle in which a portion of the pulse train having a duration of 10% of the cycle delivers more than 20% of the total power to the load which the load receives each cycle, and, supplying the pulse train to the load to supply power to the load. Accordingly, a portion of pulse train having a duration of 10% or less of the time of a cycle deliveries 20% or more of the power.

In one embodiment, the method further comprises the step of providing an electric power supply and the pulse train is produced by modulating the electric power supply to produce the pulse train.

In accordance with another aspect of the instant invention, a method of controlling the mechanical power applied to a load, the method comprises the steps of producing changes in the acceleration of a mechanical member whereby a series of differing accelerations are applied in a repeating pattern to produce the mechanical power, a portion of the series having a duration of 10% of the pattern delivers more than 20% of the total power to the load which the load receives during the repetition of each period and, supplying the mechanical power to the load to supply mechanical power to the load.

In one embodiment, the load comprises an impact member and the mechanical power is modulated to reduce degradation of a Prandtl layer which forms on the Prandtl layer as fluid travels over the impact member.

In another embodiment, the mechanical member comprises an impact member and the mechanical power is modulated to reduce degradation of a Prandtl layer which forms on the Prandtl layer as fluid travels over the impact member.

Preferably, the portion provides 30%–70%, more preferably 40–60% and most preferably 45%–55% of the total power the load receives each second.

The frequency of the pulse train may vary from 6–20 Hz and preferably 9–15 Hz. It will be appreciated that if mechanical power is being applied to a load, then the series of pulses are effectively applied in a cycle which is preferably of the same frequency as an electrical signal as taught herein. Further, each cycle may contain from 1–20, preferably 5–20, more preferably 5–15 and most preferably 9–12 pulses or differing accelerations. For example, the pulse train may be produced by providing a constant power supply to the load (eg. a constant DC or AC signal) and superimposing on the signal which is supplied to the load one or more pulses. Thus, if a single pulse is superimposed, the load will receive a signal providing a continuous power level and, once a cycle, a signal at a higher power level. Preferably, in the case of an electric signal, the increased power is provided by increasing the voltage of the signal supplied to the load. It will be appreciated that a power control system for a mechanical system may be operated in the same manner.

Further, it is also preferred that the signal is non-uniform. For example, the signal is not synchronized to occur at the same point in each rotation or series of rotations of the motor and hence is not designed to maintain a uniform angular velocity or uniform momentum or uniform power input or distribution.

Referring to FIG. 1, a plurality of different wave forms are shown. These include DC (FIG. 1a), AC (FIG. 1b), pulsed DC (FIG. 1c) and a pulse width modulated signal (FIG. 1d). The power transfer spectrum of each of these signals is substantially uniform. By this, it is meant that over a given period of time, a relatively uniform amount of power is delivered by a signal to a load. In the case of DC, it is understood that a uniform amount of power is effectively continuously provided to a load. In the case of AC or pulsed DC power, over each cycle, the same amount of power is provided. For example, in the case of a 60 Hz signal, the same amount of power is provided each ⅟60 of a second. The power transfer spectrum of a pulse width modulated system delivers substantially less than 20% of the power in 10% of the time. Therefore, measuring the cycle from one point to another, the same amount of power is provided during each cycle. A pulse width modulated signal, if provided to a motor, typically provides power to the motor at the same point in each rotation. All of these signals are designed so that the output of a device driven by these signals appears to be constant. In contrast, a pulse string according to the instant invention is shown in FIG. 1(e). As can be seen, the amount of power which is provided per unit time is non-uniform. In particular, in this example, most (e.g. 50%) of the power delivered to a load is provided in 0.006 seconds and each cycle or period lasts 0.08 seconds. The output of a device driven by such a signal does not appear to be constant. For example, in the case of a motor, a person may perceive vibrations produced by the operation of the motor.

There are many applications today in which electric motors are employed. The energy consumption of motors for pumping gases and liquids accounts for over one-quarter of all electricity consumed in the world today. There are known a number of techniques employing pulse width modulation to control the power consumption of motors. Such techniques have had modest success and generally are provided to control motor power or speed with little or no regard for improving motor efficiency. While the power is pulsed, the pulses are symmetrical (i.e. the pulses are designed to provide about the same amount of power so that the motor receives a uniform supply of power).

In accordance with the present invention, the power consumption of electric motors, particularly in such applications as the movement of air and pumping of liquids is substantially reduced while still performing the same level of work. Research by the inventor has found that these types of electromechanical assemblies have a natural resonance. Additionally, it has been found that when the electrical signal or power supplied to the device is conditioned, so as to provide energy in synchronism with natural resonant frequencies of the motor and associated equipment, the power required to produce the desired work is significantly reduced.

Additionally, this invention has general applicability to any electrical power consuming circuit or device which shows similar characteristics. That is, it is applicable to any device which shows some resonant characteristics, and where providing the power signal as a pulse train with suitable characteristics of voltage, frequency and pulse width, can improve the efficiency of the circuit by, in effect, coupling the electrical power supply to the circuit or device so that the circuit or device performs the desired work and a reduced amount of ancillary work. This in turn can reduce the power energy required to deliver the desired work.

In accordance with another aspect of the instant invention, the present inventor has realized is that it is possible to modulate or modify the signal supplied to a light bulb such as an incandescent light bulb, to improve its performance. This modulation can be applied to either an alternating current or a direct current signal.

In effect, it has been discovered that if the power supplied to the light bulb is supplied as a train of pulses, then this can significantly affect the behaviour of the light bulb. With the selection of the appropriate parameters, for lighting for direct human observation, the percentage of radiation given out as visible light can be enhanced considerably. In effect, this enables a light bulb to be run at a lower nominal power rating, while producing the same amount of visible light. This in turn means that less power is wasted as heat, so the light bulb runs cooler.

In accordance with another aspect of this invention, the present inventor has realized is that both for charging and discharging a battery, conventional techniques lead to much wastage of energy. Conventionally, as noted above, both for charging and discharging, current is drawn off essentially as a constant DC current. For practical applications, discharging will often result in a varying or intermittent current; but the essentially DC nature of the discharge certainly does not amount to a pulsed discharge as taught by the present invention and as detailed below).

What the present inventor has realized is that, for both charging and discharging, one can identify an apparent resonant effect. At the atomic level, it is believed that charging and discharging essentially requires ionization (or the reverse) of individual atoms or molecules. If such ionization is effected by application of a constant DC potential, often ionization is effected at a less than optimum quantum state, thus requiring excess energy and wastage of energy. On the other hand, if ionization is, in effect, synchronized with an optimum quantum state of the particular atom or molecule, then less energy is required.

At a macroscopic level, the inventor has discovered that this appears as a resonant effect. Thus, for charging, the inventor has discovered that if the series or train of pulses is applied during the charging process, then much more efficient charging can be obtained. In effect, between each pulse, the battery or cell is permitted to relax, and when the next pulse is applied, atoms or molecules are in an optimum state for receiving a charge. It is possible to devise an optimum wave form, to increase or to optimize the power or energy output of primary and secondary batteries and energy input to secondary batteries. This is achieved by developing an algorithm relating the power or energy obtained from (or delivered to) the battery to key parameters of the pulse train, namely, voltage, frequency and pulse width. Then, one or more, and optionally two or more of these parameters (voltage, frequency and pulse width) are optimized for a particular load, to improve the performance of the battery during charging or discharging.

It will be appreciated that apparatus embodying this mode are also within the scope of this invention.

BRIEF DESCRIPTION OF THE DRAWINGS

These and other advantages of the instant invention will be more fully and particularly understood in connection with the following description of the preferred embodiments of the invention in which.

DESCRIPTION OF THE PREFERRED EMBODIMENT

Figure 1A:
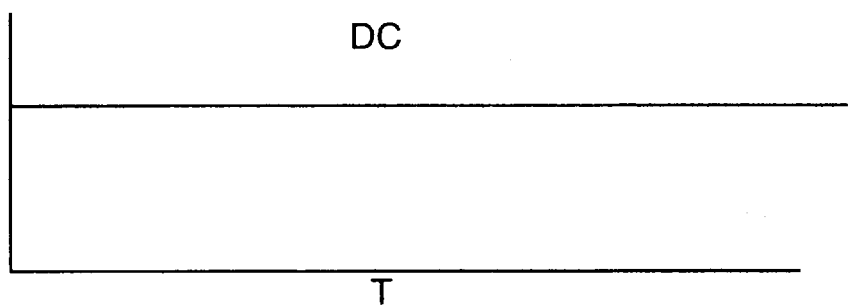
FIGS. 1(a)–(d) are prior art electrical signals and FIG. 1(e) is an electrical signal according to the instant invention.
Figure 1B:
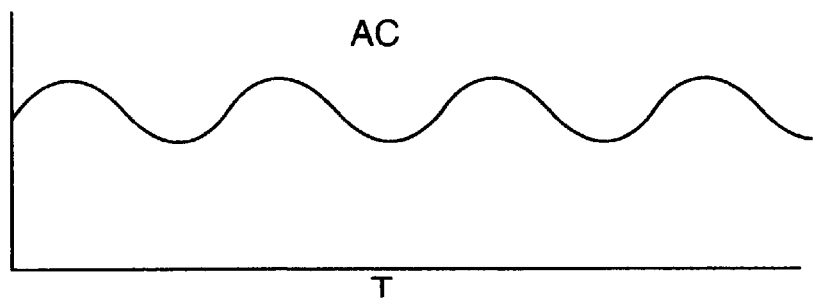
Figure 1C:
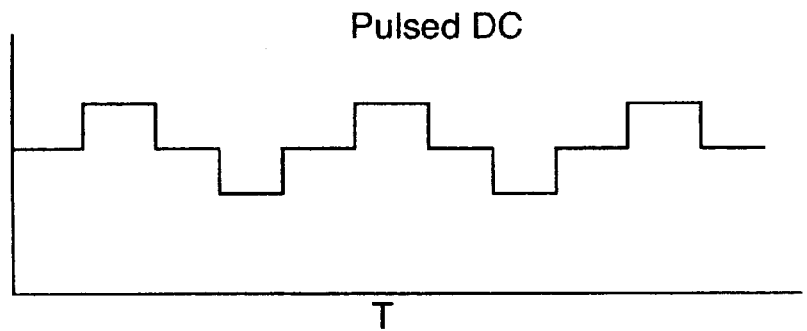
Figure 1D:
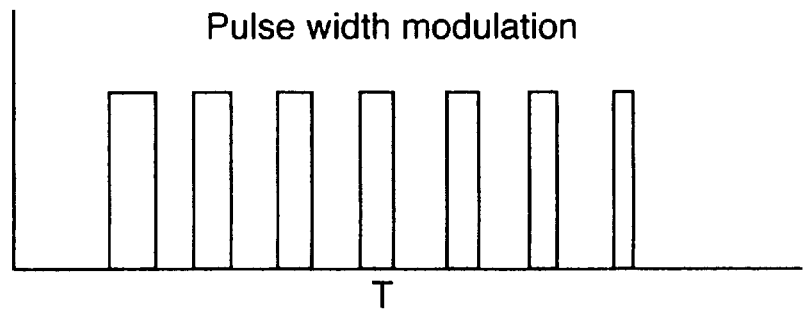
Figure 1E:
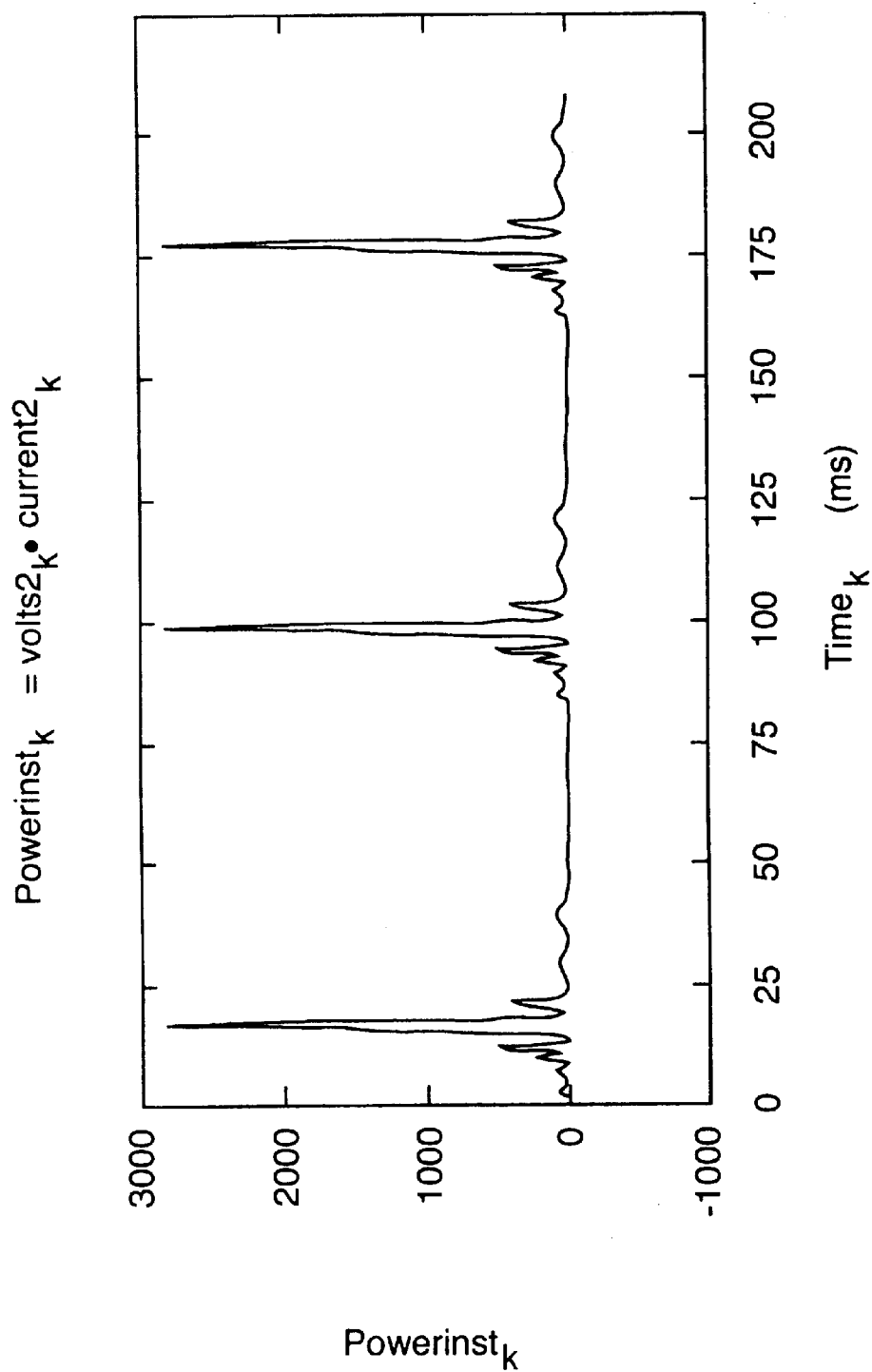

In one aspect, the invention relates to fluid mechanical systems. Fluid mechanical systems include those systems which use an impact member to transmit motive power between the impact member and the fluid. The impact member may be designed for transmitting motive power from the impact member to the fluid whereby the movement of the impact member causes the fluid to move. Examples of such systems are fans, pumps, turbines. These devices have impact members (eg. fan blades, propellers, turbine foils and the like) which interact with the fluid to produce movement of the fluid. The impact member may alternately be designed for receiving motive power from the fluid and transmitting the motive power to, eg., a drive rod on which the impact member is mounted whereby the movement of the fluid causes the impact member to move. Examples of such systems are electrical generators and a steam powered engine wherein a fluid is expanded through a turbine. In each case, the impact member, hereinafter referred to as a "vane" deflects the fluid (a gas or a liquid) to move the fluid downstream (eg. a pump) or deflection of the fluid provides motive power (such as in the case of a propeller) to a vehicle or the like to produce mechanical power (such as rotational power provided by a drive rod wherein the drive rod is rotated by rotation of the impact member) or electrical power (such as in the case of an electric generator).

By way of example, as gas passes over a fan blade, a Prandtl layer forms along the fan blade. As a fan blade rotates, a thicker boundary layer will be developed. At some point, the layer of fluid travelling along with the blade will be of a sufficient thickness such that all or a portion of the boundary layer will separate from the blade. When this occurs, turbulence or vertical flow will occur. Without being limited by theory, it is believed that as a fan blade rotates either the Prandtl layer is thickening and then thinning when a portion of it breaks off, or, alternately, that a plurality of layers are forming on top of the Prandtl layer and that these outer layers break off periodically at a certain thickness. In either case, when a portion of the layer travelling with the blade breaks off, this disrupts the Prandtl layer. The existence of the Prandtl layer is required to assist a fan blade in transmitting motive force to the fluid or receiving motive force from the fluid. Therefore preventing degradation of the Prandtl layer (e.g. the collapse of the Prandtl layer due to the sudden thickening of the boundary layer or the delamination of all or a portion of the Prandtl layer) increases the efficiency of a fan blade.

In accordance to the instant invention, power is delivered to the fan blade so as to prevent the Prandtl layer from collapsing or delaminating. By maintaining an effective Prandtl layer on a blade for a greater period of time, more of the energy which is input into the system to cause the fan blade to rotate will be transmitted to the fluid passing over the blade. Accordingly, the pulse train is modulated to vary the acceleration (which may be a negative acceleration, i.e. a deceleration) of the impact member to reduce degradation of a Prandtl layer which forms on the impact member as the fluid travels over the impact member.

Conventionally, the cyclical thickening of the boundary layer on the fan blade occurs since the power is supplied uniformly to the fan blade (i.e. a fan blade rotates at essentially a constant rpm). In accordance with the instant invention, the fan blade is decelerated (eg. the rate of rotation is reduced) prior to the Prandtl layer collapsing or delaminating. The sequential acceleration and deceleration of a fan blade causes a variation in the speed (i.e. rpm) of a fan blade that results in the Prandtl layer being more stable on the fan blade and therefore the fan blade transmits motive power to the fluid for a greater period of time during which the fan blade is rotating. In the case of an electrically operated fan blade, the blade may be accelerated and decelerated by sending a pulsed electrical signal to the motor or by not sending a signal to the motor (eg. sending a DC signal to the motor and intermittently discontinuing the DC signal whereby the motor is sequentially accelerated and decelerated) or by attenuating an AC signal. The pulsed signal is determined so as to provide the requisite acceleration or deceleration for the fan blade. The exact pulsing of the signal which is required for a fan blade will vary depending upon the actual configuration of the fan blade and the motor.

This invention has particular applicability to vacuum cleaners. As such, a motor for a vacuum cleaner is attached to a fan, for drawing air through the vacuum cleaner, so as to produce the desired vacuum effect. What the inventor has realized is that if the signal supplied to the motor is configured so as to cause deceleration just prior to collapse or delamination of the Prandtl layer, and to accelerate shortly thereafter so as to rethicken or reestablish the Prandtl layer and prevent it from completely collapsing. Thus the Prandtl layer is reduced of thinned down as opposed to collapsing or delaminating. Further, the acceleration results in the Prandtl layer being built up faster. In effect, this reduces the vortex energy thrown off from the blade, and hence significantly reduces energy losses. Accordingly, the algorithm for the pulse train for a vacuum cleaner should be developed, with this in mind. This is done simply by running a series of tests or experiments on a complete vacuum cleaner, which will allow for any effects which will alter the power consumption of the motor.

It will similarly be appreciated that the same effect may be obtained in non-electrical (i.e. mechanical systems). Once again, the mechanical system (e.g. an internal combustion engine) will be operated such that, eg., the shaft on which an impact member, eg. a piston, is mounted does not rotate at a constant rate but is accelerated and decelerated in a similar manner as an electrically operated fan blade for a vacuum cleaner so as to prevent the collapse or delamination of the Prandtl layer. More preferably, the impact member is operated so as to maintain the Prandtl layer between predetermined minimum and maximum thicknesses so that the effectiveness of the impact member in transmitting motor force to a fluid is maintained at a relatively constant level, but the angular velocity of the impact member is not held constant.

Therefore, in one aspect of the invention, there is provided a method of moving a fluid using a impact member, the method comprises providing power to rotate the impact member and form a Prandtl layer of fluid on the impact member as the impact member moves and, varying the rate of rotation of the impact member to reduce the degradation of the Prandtl layer as the fluid travels over the impact member. The impact member may comprise the power transfer member of a fluid pump and the method further comprises driving the impact member to cause the fluid to flow.

Therefore, in another aspect of the invention, there is provided a method of generating power from a fluid using a impact member comprises providing fluid to rotate the impact member and form a Prandtl layer of fluid on the impact member as the impact member moves, the impact member being drivingly connected to an apparatus for producing power in response to the rotation of the impact member and, varying the rate of rotation of the impact member to reduce the degradation of the Prandtl layer as the fluid travels over the impact member. The apparatus may comprise an electrical generator and the method further comprises driving the generator to produce electrical current. Alternately, the apparatus may comprise drive rod and the method further comprises driving the drive rod to obtain mechanical power.

Figure 2:
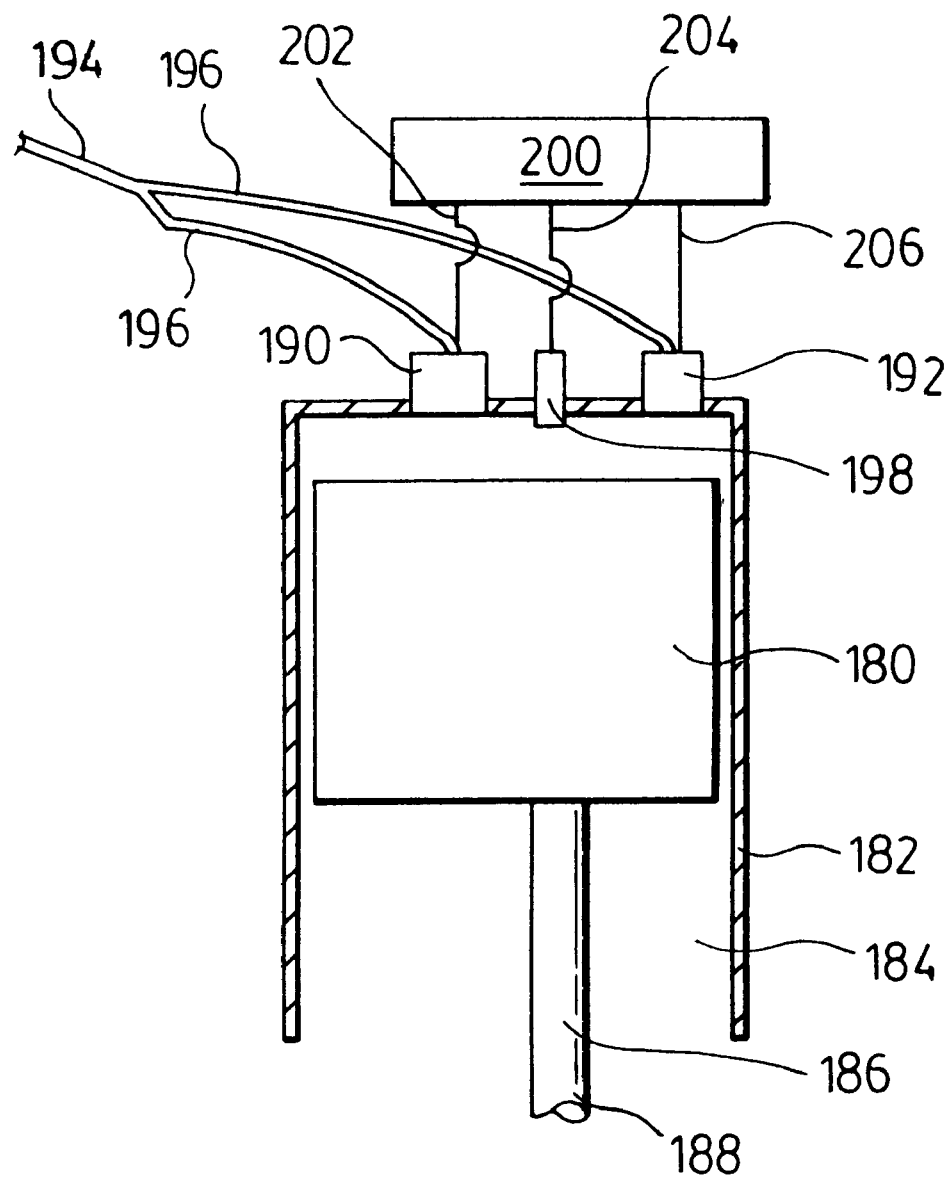
FIG. 2 is a schematic view of an internal combustion engine in accordance with the present invention.

Referring to FIG. 2, a mechanical system for providing a pulsed system according to the instant invention is shown. In accordance with this system, an internal combustion engine comprises at least one and preferably a plurality of pistons 180. Just one such piston is shown in FIG. 2 and it is received in the bore 184 of a cylinder 182. A drive rod 186 is pivotally attached to piston 182. Drive rod 186 has a distal end 188 which may be drivingly connected to a crank shaft or other power transfer coupling known in the art of internal combustion engines. Cylinder 182 is provided with first and second fuel dispensers 190 and 192, eg. fuel injectors. Each fuel dispenser is in fluid communication with a source of fuel, such as by means of a fuel line 194 which feeds individual fuel feed lines 196. A fuel ignition system, such as spark plug 198 is also provided. An electronic ignition system 200 is provided to control fuel dispenser 190, spark plug 198 and fuel dispenser 192 by means of wires 202, 204 and 206 respectively.

First and second fuel dispensers 190 and 192 provide different aliquots of fuel to cylinder 182. For example, first fuel dispenser 190 may be designed to provide one microliter of fuel to the cylinder whereas second fuel dispenser 192 may be designed to provide two microliters of fuel to cylinder 182. Moreover, the amount of fuel dispensed or injected or by each dispenser 190, 192 is preferably variable provided that differing amounts may be sequentially introduced into bore 184 so as to provide differing levels of power as described herein. Further, a single dispenser or injector may be used for each cylinder 182 provided it is capable of providing differing quantities of fuel to bore 184. Electronic ignition system 200 may sequentially actuate one or the other, or both, fuel dispensers by means of wires 202 and 206. Spark plug 198 will cause ignition of the fuel in cylinder 182. By varying the amount of fuel which is ignited in cylinder 182, the amount of acceleration exerted on piston 182 by the ignition of the fuel is varied so as to provide the requisite pulsed acceleration to any member drivenly connected to drive rod 186. Thus, for example, drive rod 186 may be drivenly connected, by any means known in the art, to an impact member. Accordingly, the modulation of the fuel flow rate to the internal combustion engine and/or the spark temperature may be utilized to accelerate and decelerate the impact member so as to prevent, or at least reduce, the collapse or delamination of the Prandtl layer on the impact member. In particular, a reduced amount of fuel and/or a lesser spark would decelerate the crank shaft while extra fuel and/or a higher spark temperature would accelerate the crank shaft.

It will also be appreciated that the same operational mode may be utilized with impact members which interact with a fluid so as to cause the fluid to do work. Examples of these include turbine and windmills which are used to generate electricity. As a fluid (e.g. air or steam) passes over a foil or turbine, a Prandtl layer is built up which cyclically thickens and thins. By interacting with, e.g., the shaft on which the turbine is mounted so as to cause the turbine to accelerate and decelerate under the influence of the fluid (eg. using a solenoid to drive a brake member to periodically contact the shaft to slow the shaft or a clutch to selectively change the load on the shaft), the thickness of the boundary layer on the turbine may be controlled so as to prevent degradation of the Prandtl layer. In this way, a greater amount of power may be transmitted by the turbine from the fluid to a system (eg. an electrical generator or to a drive rod on which an impact member is attached so as to provide rotational mechanical power). It will be appreciated that, by accelerating and decelerating the turbine, the drive rod on which the impact member is mounted will provide non-uniform rotational power. This non-uniform rotational power may be converted to linear power or, alternately, to electrical current by means of an electrical generator. The electrical signal produced by the generator may accordingly be a pulsed signal which is the digital equivalent of the non-uniform rotational power fed to the generator. Such a signal may be provided to a load. Preferably, if the mechanical power is used to drive an electric generator and the pulsed signal produced by the generator would not cause the load to perform work in an energy efficient manner, the signal may be further attenuated so as to alter the pulse train produced by the generator to one which is appropriate for the load to which the generator is supplying power. In a similar manner, the non-uniform mechanical power provided by the drive rod may also be attenuated to provide continuous power or an alternate pulsed power which is appropriate for the system to which the drive rod provides power.

Alternately, the desired acceleration and deceleration of the impact member can be achieved by applying a pulse train signal to an electromagnetic clutch which couples a prime mover to the impact member. If the impact member is a fan blade or the like, then the prime mover is the shaft which is drivingly connected to the fan blade. If the impact member is a turbine for generating electricity, then the prime mover is the drive rod which is drivenly connected to the turbine. In the case of an electromagnetic clutch, the series of electrical pulses cause differential slip to occur in the clutch thereby accelerating and decelerating the impact member. A further alternative method produces the desired acceleration and deceleration of the impact member by applying a pulse train of hydraulic pressure pulses to a hydraulic mechanical clutch which couples a prime mover to the impact member. In the case of an hydraulic mechanical clutch, the series of pressure pulses cause differential slip to occur in the clutch thereby accelerating and decelerating the impact member.

Figure 3:
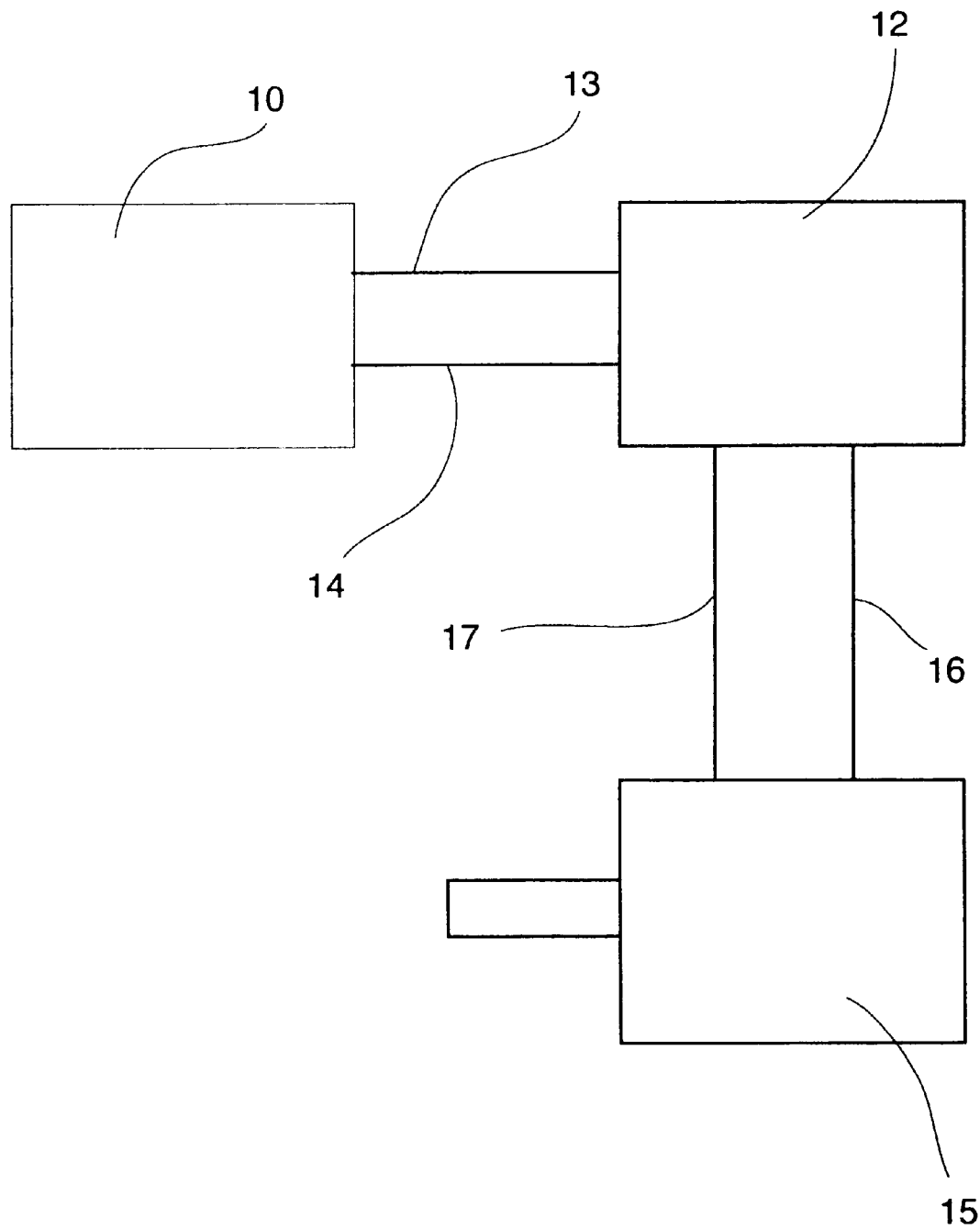
FIG. 3 is a schematic view of an apparatus and an electric motor in accordance with the present invention.

In one embodiment, the electrical signal is used to power a fan blade, such as may be used in a vacuum cleaner. FIG. 3 shows a voltage source 10, which can provide either AC or DC power, and connected to an electronic control unit 12 by connections or wires 13, 14. The electronic control unit 12 in turn is connected to the actual electric motor 15, by means of wires 16 and 17.

The electronic control unit 12 receives either an AC or DC power supply signal over the wires 13, 14. This is modified or conditioned by modulating the signal with a pulse train. The unit 12 effectively modifies one or more of the characteristics of the pulses, namely pulse width, voltage and frequency. This is done by modulating at least one, and possibly two or three of these characteristics. Thus, the unit 12 could modify: the pulse width and voltage of the signal; the frequency and voltage of the signal; the frequency and pulse width of the signal; or the frequency, pulse width and voltage together. Whichever characteristic is not modulated, is set at a fixed value.

For a given motor in a given system, the actual pulse train which is used will vary. A series of tests or experiments may be easily carried out to establish the characteristics that give optimum performance.

In order to optimize the performance of a given motor for a given load, a series of variables are sequentially altered and the power consumed is measured. For example, initially, the normal running voltage for the motor is applied and the frequency is increased in 10% increments. At each frequency increment, the pulse width of the signal is reduced until either the power consumed decreases by, eg., 25% or the motor r.p.m. is altered by more than 20%. This procedure is repeated for selected voltages, preferably 250% of the normal running voltage down to 20% of the normal running voltage such as by 10% decrements. When a voltage greater than the internal operating voltage is applied, the energy delivered in the pulses is kept to a level below the level at which degradation of the insulation by heat, or other physical damage will occur by reducing the duration (time) associated with the pulses. This data is then topographically mapped and an algorithm to optimize the motor is selected so as to reduce the power consumed by modulating the applied voltage, applied frequency and pulse width of the signal.

The pulse train comprises a set cycle of pulses, for example, a plurality of pulses that may be of the order of 10 pulses or more longer. Pulses within the cycle can vary, in terms of their pulse width and pulse height. This cycle is repeated continuously, to generate the pulse train.

Figure 4:
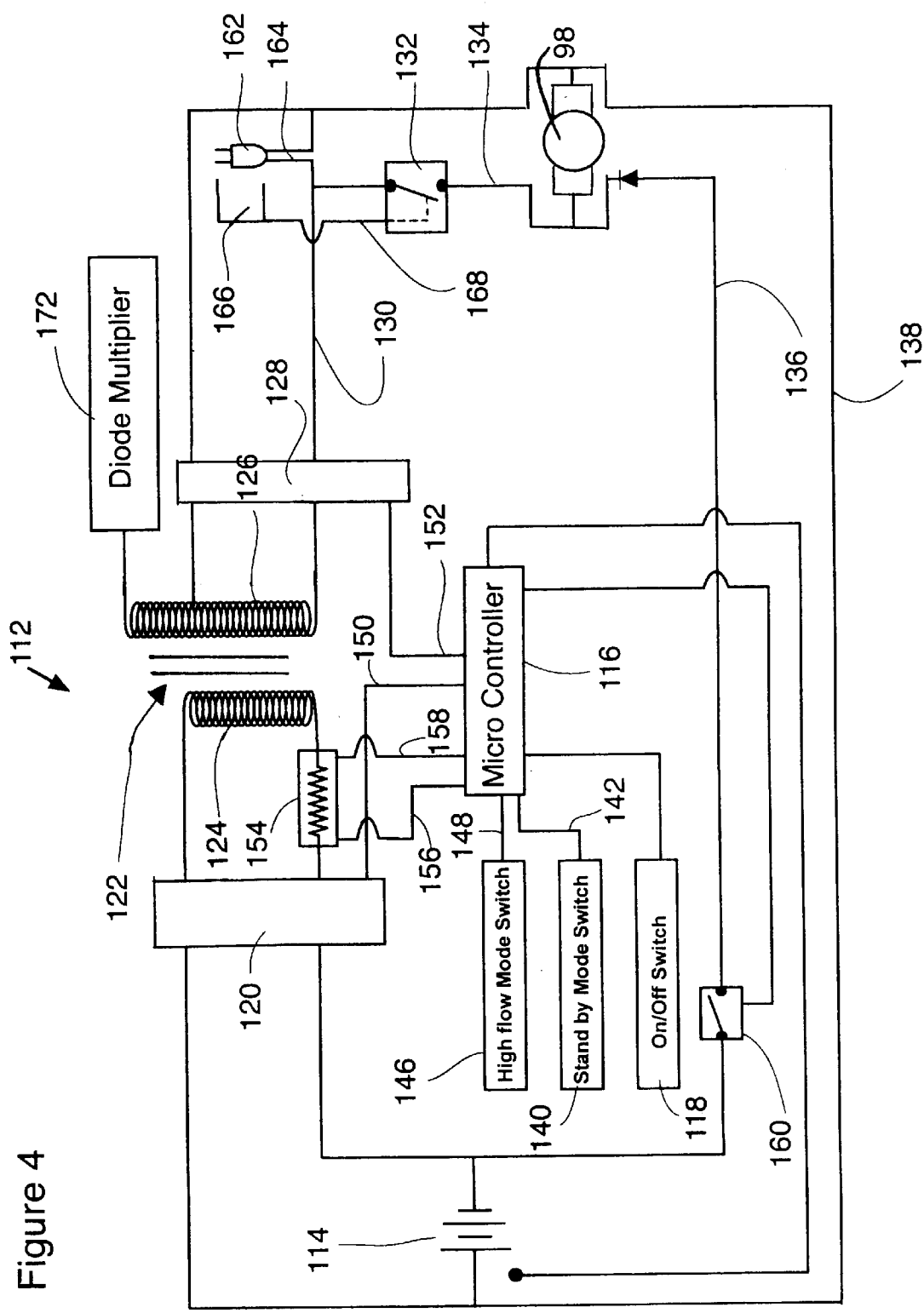
FIG. 4 is a circuit schematic which may be used with the apparatus of FIG. 3.
Figure 5:
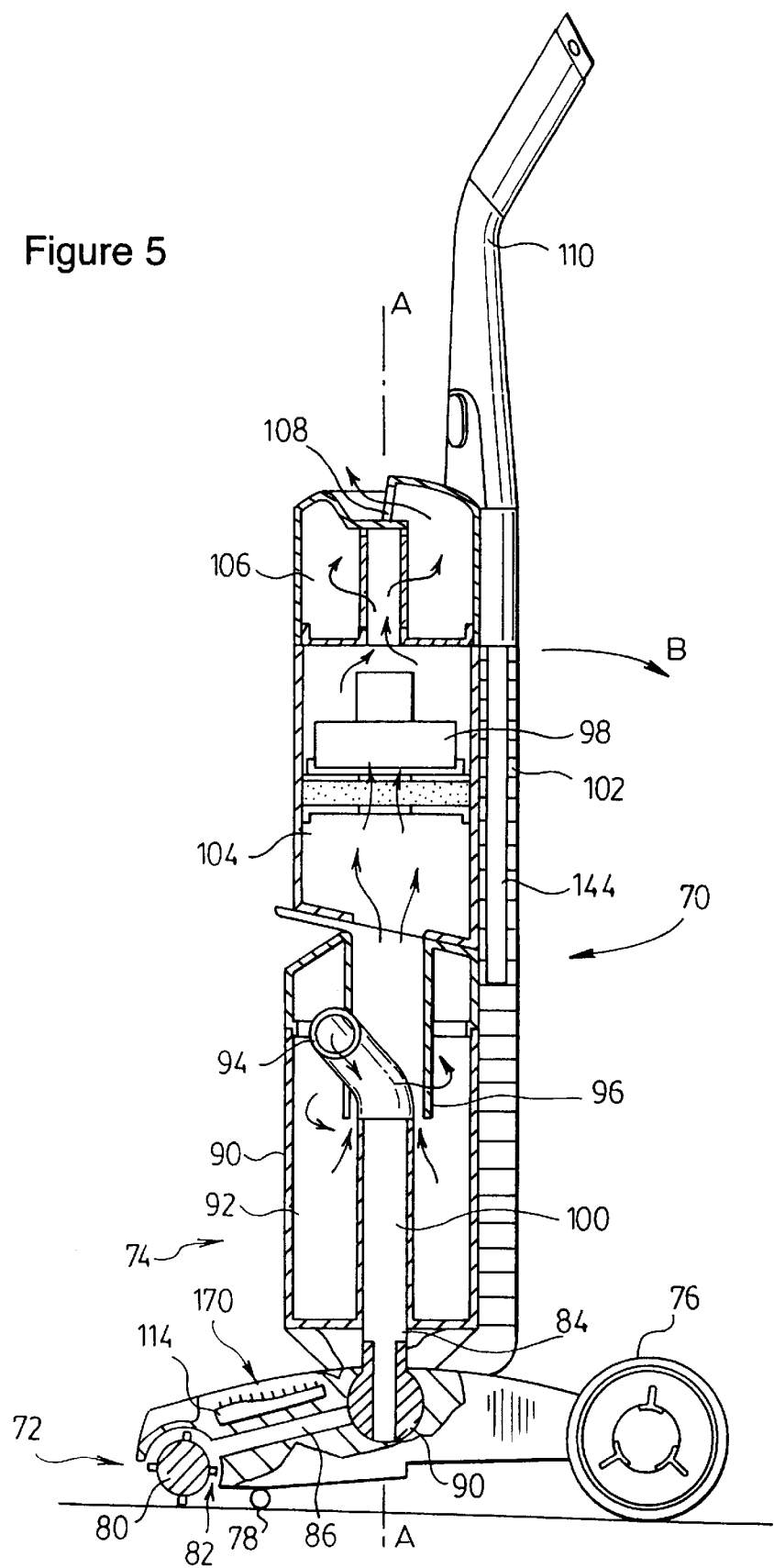
FIG. 5 is a cross-section of a vacuum cleaner including the motor control circuit of FIG. 4.

FIG. 4 shows a motor control circuit which may be used in a vacuum cleaner in accordance with the instant invention. FIG. 5 exemplifies a vacuum cleaner including the circuit. As shown in FIG. 5, an upright vacuum cleaner 70 has vacuum cleaner head 72 and main casing 74. Cleaning head 72 has rear wheels 76 and front wheels 78 to enable movement of cleaning head 72 across a surface. Cleaning head 72 is provided with a rotatably mounted brush 80 which is positioned above air inlet 82. Cleaning head 72 has an air outlet 84 positioned at the end of air flow path 86. Rotatable valve 88 is provided in the cleaning head 72 so as to isolate the filtration means in main casing 72 from air flow path 86 when the vacuum cleaner is in the upright position shown in FIG. 5.

Main casing 74 contains the filtration means which preferably comprises cyclone housing 90 defining cyclone chamber 92. Cyclone chamber 92 is provided with an air inlet 94 which is in air flow communication with air outlet 84 by means of air flow path 100. Vacuum cleaner 70 may also be adapted for above floor cleaning such as by means of hose 102 which is releasably connectable to main casing 74.

Motor 98 is positioned above and downstream from air outlet 96. Outlet 108 from vacuum cleaner 70 is provided downstream from motor 98. Additional filtration means may be provided, if desired, in one or both of chambers 104 and 106. Handle 110 is provided so as to enable the vacuum cleaner to be pushed by a user.

It will be appreciated by those skilled in the art that the motor control circuit of the instant application may be utilized with any vacuum cleaner, such as with a vacuum cleaner using any filtration means known in the art, as well as any type of vacuum cleaner, e.g. upright, canister, backpack and central vacuum systems. According to one aspect of the instant invention, the motor control circuit may be utilized with a vacuum cleaner which is to be plugged into a standard electrical outlet in a house. In such a case, the power control system is designed to reduce the power required by the motor. Alternately, the power control system may also be used with a vacuum cleaner which is powered by rechargeable batteries. Preferably, in such a case, the power control system also controls the charging and discharging the batteries.

Referring to FIG. 4, power control circuit 112 comprises a motor controller as well as a battery charger. Battery 114 supplies 50% the power for motor 98 as DC current. The other half of the power is supplied to the motor through an inverter (namely field effect transistor 120 and transformer 122). This has the advantage that half the power is transmitted as DC (which has nominal circuit losses) and half is transmitted through the inverter (which may have an efficiency of eg. about 85%) for an overall efficiency of about 92.5%. It is recognized that by increasing the power channelled through the inverter, the flow rate of the mechanical system can be controlled. However, increasing the power channelled through the inverter increases the heat losses through the circuit and mitigates a portion of the energy saving realized in the fluid mechanical portion of the system. It will be appreciated the battery 114 may supply all of the power to motor 98 through the inverter circuit resulting in about a 7.5% reduction in the power savings. The instant design also advantageously allows multiple power levels to be supplied to motor 98.

The vacuum cleaner is operated by a user turning the vacuum cleaner on by an on/off switch 118, which may be any switch known in the art. When vacuum cleaner 70 is turned on, micro controller 116 receives a signal from switch 118 and in turn starts to oscillate field effect transistor 120 at a high frequency (e.g. about 60 KHz). Circuit 112 is provided with transformer 122 having primary and secondary coils 124 and 126. The high frequency oscillation produced by field effect transistor 120 causes primary coils 124 to induce a high voltage in secondary coils 126. The high voltage induced in second coil 126 is switched on and off by field effect transistor 128 at a much lower frequency (e.g. 9 Hz) as controlled by micro controller 116 by means of wire 152. The high voltage induced in second coil 126 may also be supplied to diode multiplier 172 which to provide current to, eg. an electrostatic generator in vacuum cleaner 70.

Field effect transistor 128 is connected to motor 98 via wire 130, switch 132 and wire 134. Accordingly, the pulse train developed by field effect transistor 128 is supplied to motor 98 so as to cause sub-rotational accelerations as described herein whereby the efficiency of the power transfer from motor 98 to the fluid stream passing through vacuum cleaner 70 is improved.

In a cyclonic vacuum cleaner, the impulses are preferably $1/81$ seconds long having a voltage (amplitude) six times greater than the DC voltage supplied by battery 114 to motor 98 by means of wires 136, 138. The frequency of the pulses produced by field effect transition 128 is preferably 6–20 Hz for a cyclonic vacuum cleaner using a series universal motor wound to produce the desired flow rate when 50 volts AC is applied with 200 watts available. It will be appreciated that the pulse which is provided to motor 98 may be varied by changing the frequency of field effect transistor 128.

In accordance with another aspect of this invention, circuit 112 may include a microswitch 140 which is activated when vacuum cleaner 70 is placed in the upright position shown in FIG. 4 (i.e. axis A of main casing 74 is essentially perpendicular to the surface being cleaned). Microswitch 140 may be of any known in the art which will provide a signal to microcontroller 116 depending upon the position of upper casing 74.

Microswitch 140 causes a signal to be sent to microcontroller 116 by means of wire 142. This causes microcontroller 116 to terminate the oscillation of field effect transistors 120 and 128 thereby reducing the power consumption and air flow through motor and fan blade assembly 98.

Typically, a user may leave a vacuum cleaner running when in the upright position when attending to other tasks associated with vacuuming such as to move furniture or other objects which may be in the way. When microswitch 140 is actuated, moving the vacuum cleaner into a standby mode, the power consumed by motor and fan blade assembly 98 is reduced thereby permitting a user to move furniture, answer the telephone or the like while reducing the power consumption of motor and fan blade assembly 98. Microswitch 140 may be utilized to switch a vacuum cleaner operating from a standard electrical outlet to a standby mode. This may be advantageous to decrease the noise produced by vacuum cleaner 70 when it is not being used. However, use of the standby mode is particular advantageous in a battery powered vacuum cleaner.

Optionally, hose 102 is detachable from main casing 74 so as to enable above the floor cleaning, e.g. hose 102 may have a rigid wand 114 slidably received therein for receiving a crevice cleaning tool or other attachment. In such a case, circuit 112 preferably also includes microswitch 146 for switching motor and fan blade assembly 98 to a high flow mode. The higher flow is desirable for enhanced cleaning using accessory tools. Alternately, as the use of a hose causes additional pressure losses, increasing the power provided to motor and fan blade assembly 98 may result in the same flow rate when hose 102 is used. Microswitch 146 may be provided in the receptacle in which hose 102 is received and actuated when hose 102 is released from the receptacle (in the direction of arrow B). Microswitch 146 may be a pressure actuated switch (i.e. the switch may have a button which is pressed inwardly). When hose 102 is released, the button extends outwardly thereby sending a signal to microcontroller 116 by means of wire 148. In response to this signal, microcontroller 116 sends a signal to field effect transistors 120 and 128 by means of wires 150 and 152 respectively. This causes field effect transistor 120 to oscillate at a high frequency (e.g. 60 KHz or greater) and cause field effect transistor 128 to oscillate at a higher frequency than before (e.g. 11–15 Hz) with pulses of, e.g. $1/81$ to $1/60$ of a second for a typical cyclonic vacuum cleaner as described above. The longer pulse width and/or greater frequency of pulses delivered to motor and fan blade assembly 98 produces a higher flow of air through vacuum cleaner 70 then when the vacuum cleaner is drawing dirt laden air through inlet 82.

In accordance with another aspect of the instant invention, microcontroller 116 also includes a circuit for determining a level of charge remaining in battery 114. To this end, microcontroller 116 sends a signal to field effect transistor 120 which causes field effect transistor to switch on for a short period (e.g. approximately 0.1–0.2seconds). This produces an impulse equivalent to DC. As the frequency of this impulse is very low, transformer 122 effectively becomes a low resistance short circuit across battery 114 thereby causing a current surge through low value resistor 154 which is series with transformer 122.

The voltage drop across low value resistor 154 caused by the current surge is conducted to (e.g.) the analog to digital port of microcontroller 116 by means of wires 156 and 158. While the voltage which is supplied by battery 114 may be relatively constant over a substantial portion of the operating life of a battery (e.g. 75% or more), it has surprisingly been determined that the rate of rise of current in response to a momentary short circuit does not remain constant. In particular, as the capacity of the battery is reduced (i.e. charge is withdrawn from the battery), the ability of battery 114 to supply a current surge is also reduced. Therefore, it is possible to determine the capacity remaining in the battery by occasionally producing a short circuit across battery 114 and monitoring the rate of rise of the current in response to the short circuit. For a NiMH sub C battery pack comprising two sets of twelve sintered cells connected in parallel, the di/dt varies from 300 A/S to 120 A/S from 90% capacity to 20% capacity while the voltage output is essentially constant. Thus, by knowing the di/dt relationship for a battery over the capacity for a battery, microcontroller 116 may provide a signal indicating the amount of capacity remaining in the battery or, if the battery is being charged, the degree to which the battery has been charged.

The same method may be utilized during the recharging of the battery to determine the charge state of the battery. Typically, the charge state of the battery is determined using the −ΔV. When a battery is in the −ΔV range, it is already overcharged. Rechargeable batteries are subject to degradation if their temperature increases too much, which occurs when they are overcharged. Therefore, it is advantageous to determine the charged state of a battery prior to the battery becoming overcharged. Accordingly, during the recharging of a battery, microcontroller 116 may cause field effect transformer 120 to occasionally emit a low frequency pulse thereby producing a current surge which may be measured by the voltage drop across low value resistor 154.

Preferably, microcontroller 116 includes means for opening the circuit to thereby shut off motor and fan blade assembly 98 when battery 114 is at a sufficiently low charge level. Accordingly, circuit 112 may shut down the power drawn from battery 114 by opening relay 160 which opens the circuit to motor and fan blade assembly 98 and by terminating the signals which are send to field effect transistors 120 and 128.

It will be appreciated that battery 114 may be charged by removing battery 114 from vacuum cleaner 70 and placing it in a suitable charging unit. Preferably, battery 114 is charged in situ. To this end, vacuum cleaner 70 may include a plug 162 which is suitable for being received in a standard electrical outlet. Plug 162 is connected to circuit 112 by means of cord 164. When plug 162 is withdrawn from receptacle 166 (which may be provided at any desired position in vacuum cleaner 70), mechanical lever 168 trips switch 132 so as to disconnect motor and fan blade assembly 98 from the current. In this way, motor and fan blade assembly 98 will still receive current from wires 136 and 138 thereby causing motor and fan blade assembly 98 to operate at low power during the recharging operation. The operation of motor and fan blade assembly 98 at low voltage DC during the recharging operation causes motor and fan blade assembly 98 to operate at a low speed so that air may be drawn across battery 114 and over, e.g., heat sink 170 which is thermally connected to battery 114 so as to cool battery 114 while it is being charged. Optionally, switch 132 may be arranged to disconnect wire 136 from motor and fan blade assembly 98 so that motor and fan blade assembly 98 will not operate during the charging mode or to close another circuit to operate a cooling motor and fan assembly provided in air flow communication with battery 114 to reduce the sensible temperature of battery 114 during charging.

When plug 162 is removed from receptacle 166, a signal is sent to microcontroller 116 such that when plug 162 is plugged into a standard power outlet, field effect transistor 128 is operated at, e.g. 60 KHz by microcontroller 116 while field effect transistor 120 provides low frequency pulses (eg. 10 Hz) to charge battery 114. The frequency of operation of field effect transistor 128 can be raised or lowered to vary the output voltage used to charge battery 114.

Figure 6:
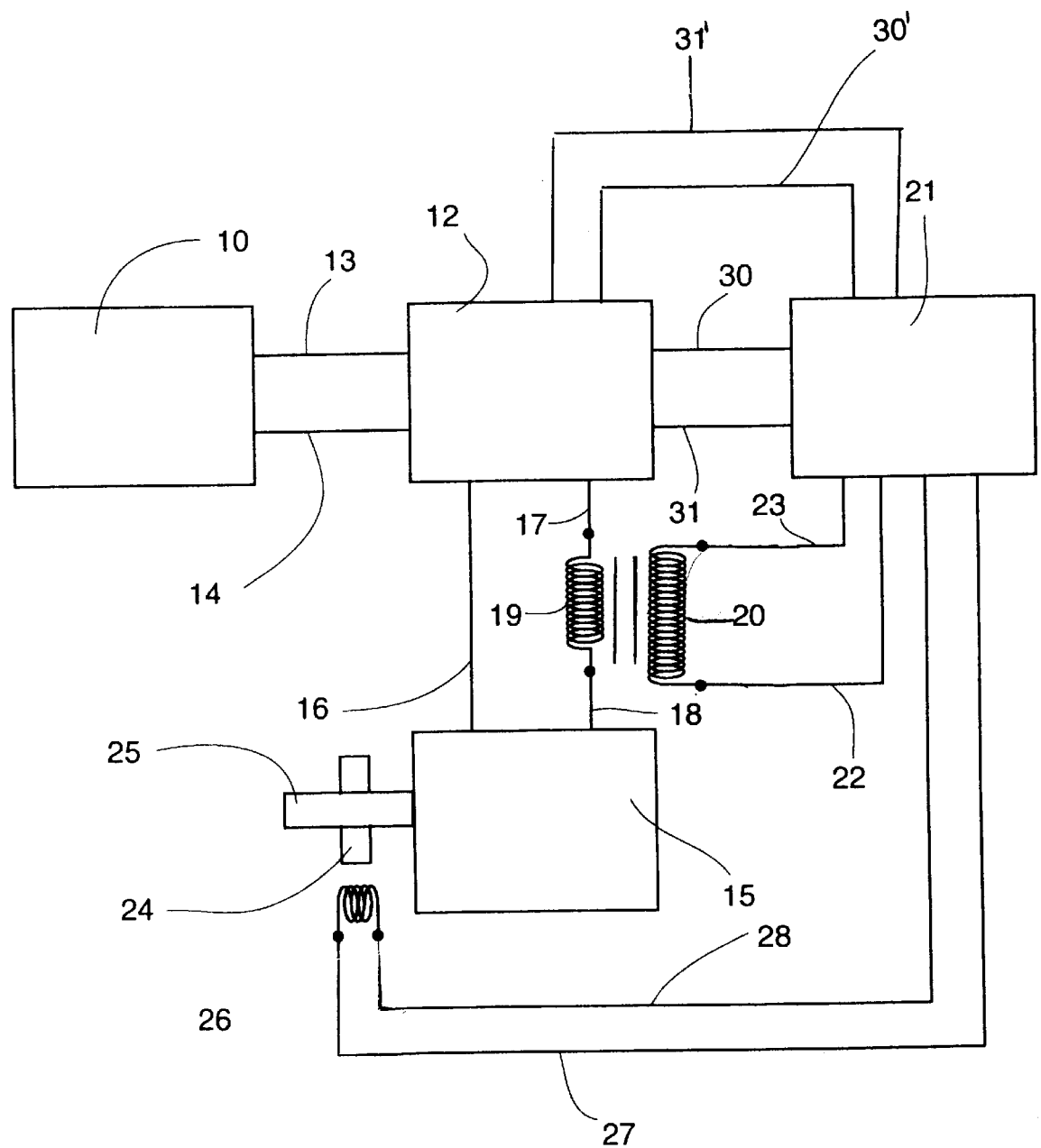
FIG. 6 is an alternate schematic view of an apparatus and an electric motor in accordance with the present invention.

The power control system may be designed to automatically optimize the power consumption of a system. Referring to FIG. 6, the system of FIG. 3 has added thereto a feedback system. In this embodiment, electronic control unit 12 is connected by wire 16 directly to a motor 15, and by wires 17 and 18 and an inductor 19, in series, to the motor 15.

A second inductor 20 is provided, inductively coupled to the inductor 19, and connected to a second electronic control unit 21 by wires 22 and 23. The second electronic control unit 21 receives power through wires 30 and 31, connected to the first electronic control unit 12. Additionally, the second electronic control unit 21 provides control information, detailed below, to the first electronic control unit 12 through the wires 30, 31.

To monitor the motor speed, a magnet 24 is mounted on the rotating shaft 25 of the motor, and is magnetically coupled to an inductor 26. The inductor 26 is connected by wires 27 and 28 to the second electronic control unit 21. Thus, rotation of the shaft 25 and the magnet 24 generate a pulse train from the inductor 26, which is detected by the second electronic control unit 21, and the frequency of this pulse train is proportional to the speed of the motor 15.

A control input for the electronic control unit 21 is indicated schematically at 29. Although shown as a single lead, it will be understood that this could comprise a multiple lead input. It enables input of desired or intended characteristics for the motor behaviour, for example, speed and power supplied to the motor.

In use, the second electronic control unit 21 receives signals indicative of motor speed and current supplied to the motor. The control unit 21 is also pre-loaded with an algorithm relating motor performance to the three main parameters of a pulse train, namely frequency, pulse width and pulse height (or voltage). In dependence on this algorithm, sensed motor conditions or load and the input at 29, the electronic control unit 21 sends control signals to the first electronic control unit 12, to cause the control unit 12 to deliver a pulse train to the motor 15, which pulse train will give the desired motor performance.

In accordance with another aspect of the instant invention, the power control system is used in the management of power which is provided to a radiation emitting device such as an incandescent light bulb, a fluorescent light bulb and a sodium lamp. In all light emitting devices, electrical energy is input into the system to produce electrons having a higher electrical charge. These electrons are dynamically unstable and return to their natural orbital state. When this occurs, photons are emitted which result in the production of light. When energy is provided as a continuous signal to electrons, the electrons are raised to numerous quantum states. When the electrons release the additional energy imparted to them, they return to their natural orbital state and emit radiation. As the electrons are changing quantum states at essentially the same time, and as the release of energy from different quantum states produces a different wavelengths of radiation, the electrons, and accordingly the light emitting member, will emit a broad spectrum of radiation. An example of this are light bulbs which provide light not only in the visible spectrum but, in addition, light bulbs also emit radiation in other parts of the radiation spectrum including ultraviolet and infrared. In particular, the radiation emitting member (e.g. a filament in the case of an electric light bulb or the gas in the case of a fluorescent light or electrodes in the case of sodium lamps) will emit a broad spectrum of light when a continuous symmetrical signal (eg. AC current) is provided to the radiation emitting member.

In typical lighting applications, the provision of visible light is all that is required. However, the radiation which is emitted by an electron when it changes from one quantum state to another varies depending upon the beginning and end quantum state. Therefore, by controlling the quantum states to which the electrons are raised when excited, the radiation which is produced when an electron reverts to its normal quantum state may be controlled so as to provide radiation in only a desired portion of the spectrum (eg. visible light in the case of light bulbs).

Accordingly, in accordance with the instant invention, the power control system provides electricity to the radiation emitting member so as to excite electrons to only specific quantum states. In standard lighting applications, the electric current to the light emitting member preferably would be attenuated so as to produce only or at least more visible light. However, it will be appreciated that in some applications it may be desirable to produce more and preferably only infrared light, x-rays or another spectrum of radiation.

Figure 7:
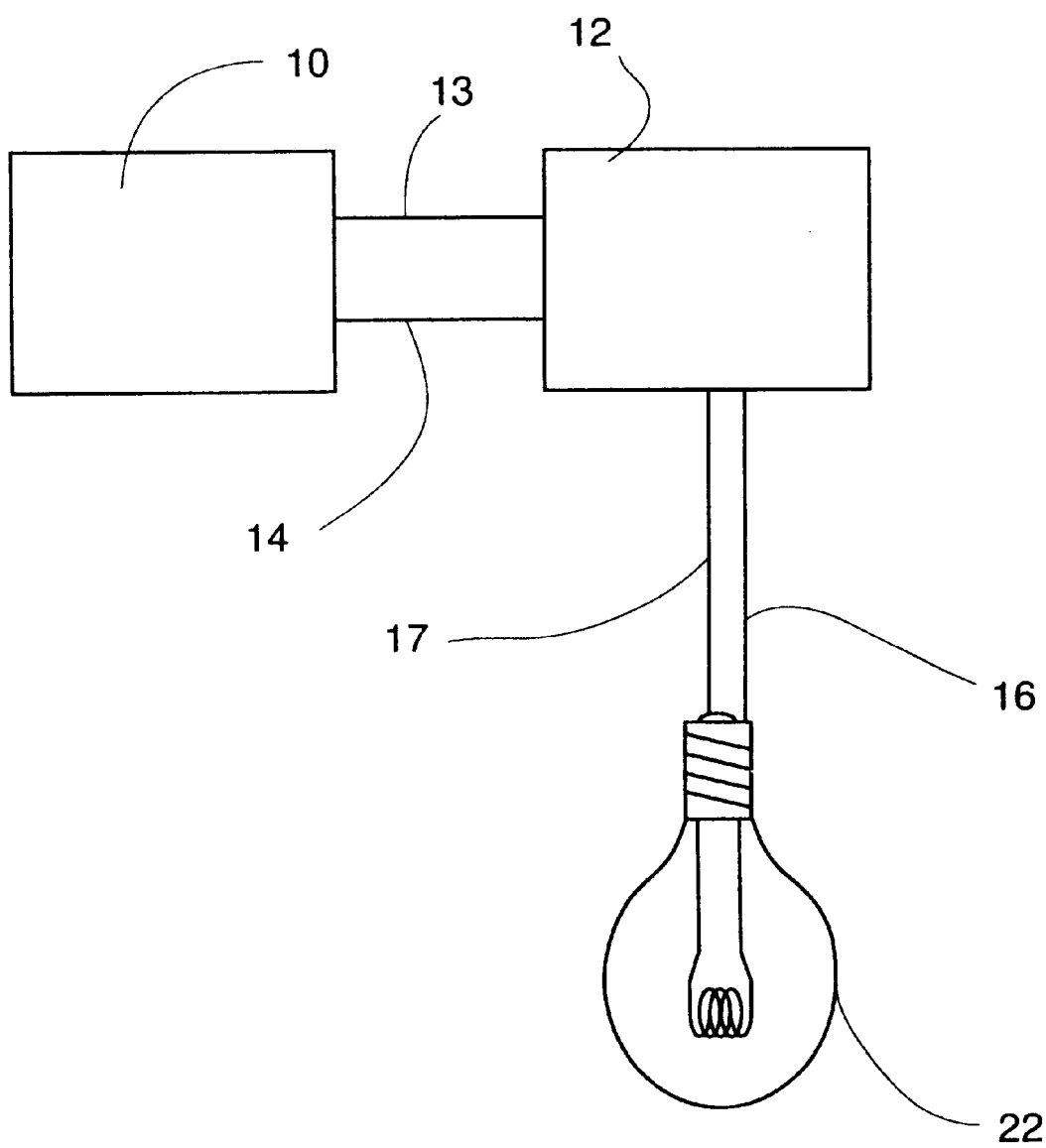
FIG. 7 is an alternate schematic view of an apparatus and an light bulb in accordance with the present invention.

A power control system for use with, eg., an incandescent light bulb is shown in FIG. 7. Commonly, for domestic and industrial applications, voltage source 10 may be an alternating current source, for example a 120 V, 60 Hz supply as used throughout North America. However, it is equally applicable to a DC source. Electronic control unit 12 is connected to an incandescent light bulb 22, by wires 16 and 17. The light bulb 22 is shown schematically, and it will be understood by those skilled in the art that, commonly, the wires 16 and 17 will be connected to a fixed, light fixture, providing a socket into which the light bulb 22 is itself mounted.

Therefore, in one aspect of the invention, there is provided a method for operating a radiation emitting device having a radiation emitting member in a plurality of bands when a uniform electrical signal is provided to the radiation emitting member wherein the method comprises providing a power supply to produce a signal to excite selected quantum states within the radiation emitting member to preferentially produce radiation is a selected spectrum and, supplying the signal to the radiation emitting device to supply power to the radiation emitting member. The radiation emitting member may comprises an incandescent light bulb, a fluorescent light bulb or a sodium lamp and the radiation emitting member comprises a filament, gas in the fluorescent light bulb and electrodes respectively.

In accordance with another aspect of the instant invention, the power control system is used in the management of power for charging secondary (i.e. rechargeable) batteries as well as discharging of secondary and primary (eg. alkaline) batteries. Generally, batteries provide current, or are charged, by causing a chemical reaction to occur within the battery. For example, when a battery is used to produce power, a chemical reaction occurs within the battery which causes a flow of electrons between the electrodes in the battery so as to produce an electrical current. Conversely, when a battery is being charged, electrons are input into the battery to cause a chemical reaction to be reversed thereby effectively storing the electrons for later use.

It will be appreciated that the chemical reaction which occurs when a battery is charged or discharged is not a single reaction. In particular, a plurality of sequential steps occur whereby the charge storing compounds (reactants) react to produce electrons and unstable products. These products become reactants in subsequent reactions which occur to produce stable products. Each of these reactions proceeds at a different rate. The exact reaction which will occur as well as the rates of reactions vary depending on the type of battery which is being used (e.g. an alkaline battery, a lithium battery or a nickel metal hydride battery).

The reactions which occur when a battery is being discharged produce electrons having different potentials. The electrons which have a higher potential will result in the production of more electrical power from the power. However, if these higher potential electrons are utilized to complete reactions which may be completed by electrons having a lower potential, then the extra potential will result in the production of work which manifests itself as heat. Currently, the standard approach is to discharge a battery by drawing a constant flow of electrons from the battery. The disadvantage of this approach is that the different reactions which occur when a battery is being discharged compete for electrons since each reaction wants to go to completion. Thus, electrons having a higher potential will be used to complete reactions which would go to completion by utilizing lower potential electrons.

In accordance to the instant invention, power is withdrawn from a battery in a discontinuous manner so that the reactions are allowed to proceed more toward completion. In this way, a greater percentage of the higher potential electrons may be withdrawn from the battery and applied to a load so as to perform work. Further, this reduces the heating of batteries which results in the degradation of secondary batteries. By modulating the electron flow from a battery to preferentially use higher potential electrons to provide power to an external load, the actual amount of power which may be withdrawn from a battery may be substantially increased above a manufacturer's specification. For example, by using the power control system of the instant invention, a sintered NiMH D cell battery which is designed by a manufacturer to provide 1.2 volts continuously for 6.5 amp hours may be used to provide 1.2 volts for 7.7 amp hours when pulse train discharging is used.

Therefore, in accordance with this invention, a method for discharging a battery comprises modulating the electron flow from the battery to preferentially use higher potential electrons to provide energy to an external load.

Figure 8:
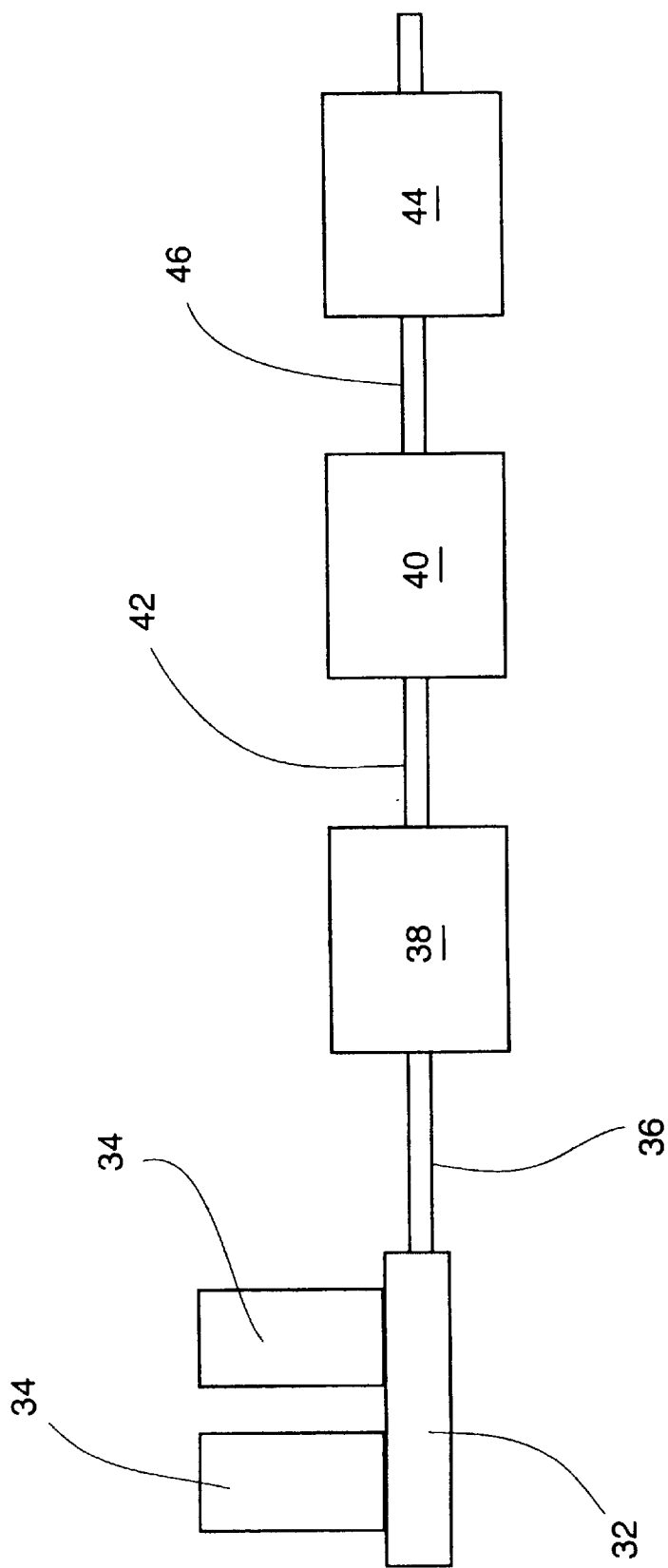
FIG. 8 is an alternate schematic view of an apparatus for discharging a battery in accordance with the present invention.

FIG. 8 shows an apparatus in accordance with the present invention for discharging a battery. Battery holder or connector 32 is shown connected to a pair of batteries or cells 34. It will be understood that, in known manner, either a single battery could be provided or two or more batteries could be provided, connected either in parallel or in series. Additionally, as already noted, the batteries could be either primary cells or secondary cells.

The battery connector 32 is connected by wires 36 to an electronic control unit 38. This electronic control unit 38 imparts a pulsed wave form to the current drawn from the batteries 34. The electronic control unit 38 itself takes power necessary for its operation from the batteries 34, but the additional load is minimal, and much less than any power saving achieved.

FIG. 8 also shows a second electronic control unit 40 connected by wires 42 to the first electronic control unit 38. This unit is intended, in this particular embodiment, to further attenuate the signal, to make it suitable for the desired load. For some applications, this second electronic control unit 40 could be omitted. The load for this embodiment is an electric motor, indicated at 44 and connected by wires 46 to the second electronic control unit 40.

Conventionally, the motor 44 would simply draw a relatively constant current from the batteries 34. In the present invention, the control unit 38 serves to modulate this current drain to give a pulsed wave form. When pulses are provided, it is believed that a relaxation period following each pulse ensures that during each pulse all or most of the charge is drawn at an optimal state. This reduces the losses and leads to more efficient recovery of energy stored in the battery or cell.

Conversely, it will be appreciated that the time required to recharge a battery may be substantially reduced by using the power control system of the instant invention. By modulating the electron flow to a battery so as to preferentially use lower potential electrons in those reactions requiring only lower potential electrons, the amount of energy which is required to charge a battery is reduced and this consequently decreases the amount of time which is required to recharge the battery. The electron flow which is provided to a battery contains electrons at various power levels. When a battery is being recharged, by driving the reactions in reverse and allowing them to proceed more to completion, fewer high potential electrons are required to be input into a system so as to recharge the battery to its desired charge state. Allowing the reaction to proceed more to completion, in either direction, decreases the competition for the higher potential electrons. Currently, batteries may be recharged at a rate of up to about C/1 without unduly degrading the battery. At higher rates, excessive heating occurs which will degrade the battery. By using the power control system of the instant invention, a battery may be recharged at, for example C/0.25 (ie. for a battery which may be discharged in one hour, the battery may be recharged in 15 minutes).

Therefore, in accordance with this invention, a method for charging a rechargeable battery comprises providing an electrical signal to reverse chemical reactions which occur during the discharge of the battery wherein different chemical reactions can utilize electrons having differing potentials and modulating the signal to preferentially use electrons having a higher potential to reverse chemical reactions requiring higher potential electrons.

Figure 9:
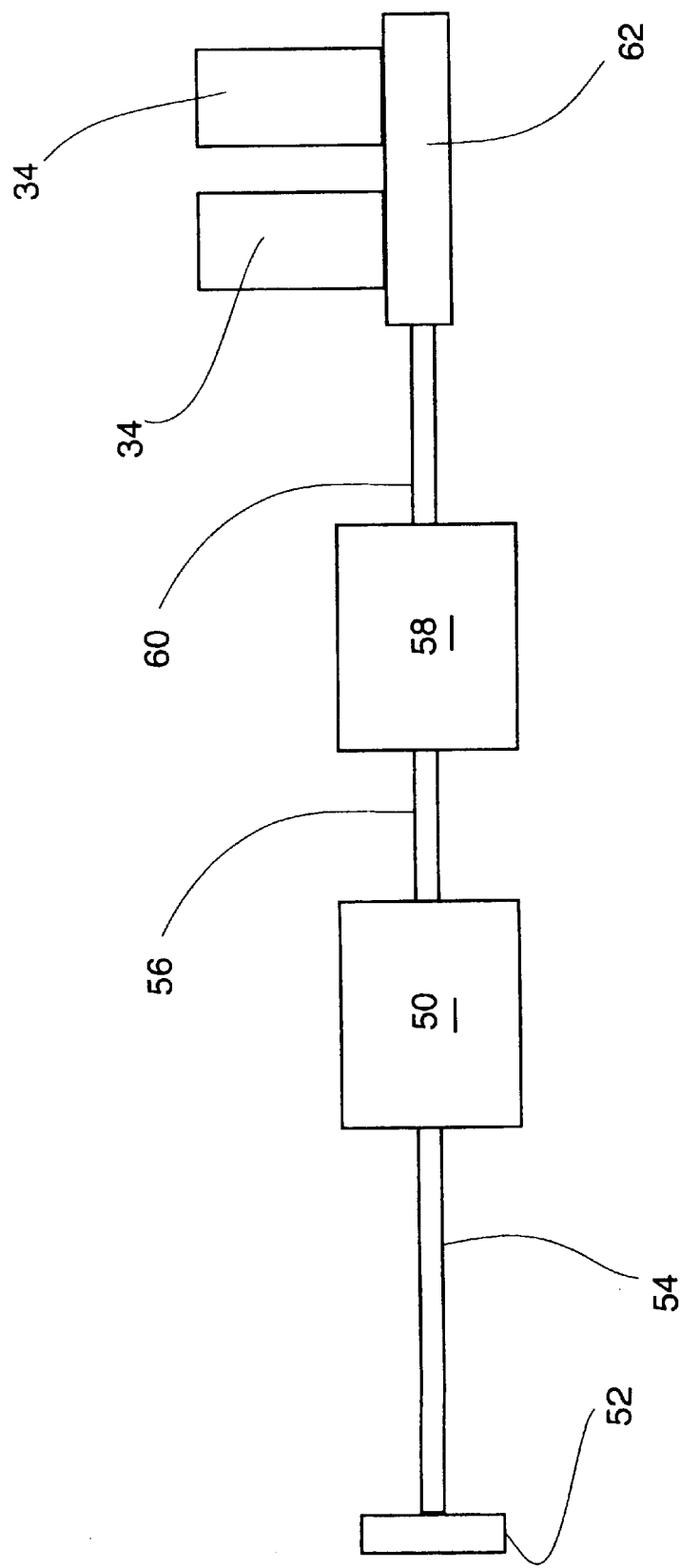
FIG. 9 is an alternate schematic view of an apparatus for charging a battery in accordance with the present invention.

FIG. 9 shows an apparatus in accordance with the present invention for charging a battery. The apparatus includes a basic transformer and rectifier unit 50, as is common for any secondary battery charger. The transformer and rectifier 50 is connected to a plug 52, shown schematically, by leads or wires 54. The plug 52, in known manner is adapted for connection to a standard alternating current supply. The unit 50 then transforms the alternating supply to a suitable potential and rectifies this potential to provide a DC output.

Leads 56 connect the DC output signal from the a transformer and rectifier 50 to an electronic control unit 58 which is adapted to modulate the DC signal with a pulse train.

The electronic control unit 58 is connected by leads 60 to a charger unit 62. As for conventional chargers, the charger unit 62 is adapted to receive at least one secondary cell, and preferably adapted to receive a plurality of such secondary cells as indicated at 34.

The electronic control unit 58, as mentioned, is adapted to modulate the DC signal received through the wires or leads 56 with a pulse train. This pulse train essentially comprises a sequence of a large number of pulses, each of which can have differing characteristics, in terms of pulse widths and pulse height or voltage amplitude. At least one, and preferably two, of these parameters (pulse width, frequency and voltage) can be selected and then modified to give the best result. The complete cycle of pulses is continuously repeated, so as to provide a continuous pulse train.

EXAMPLE 1

Figure 10:
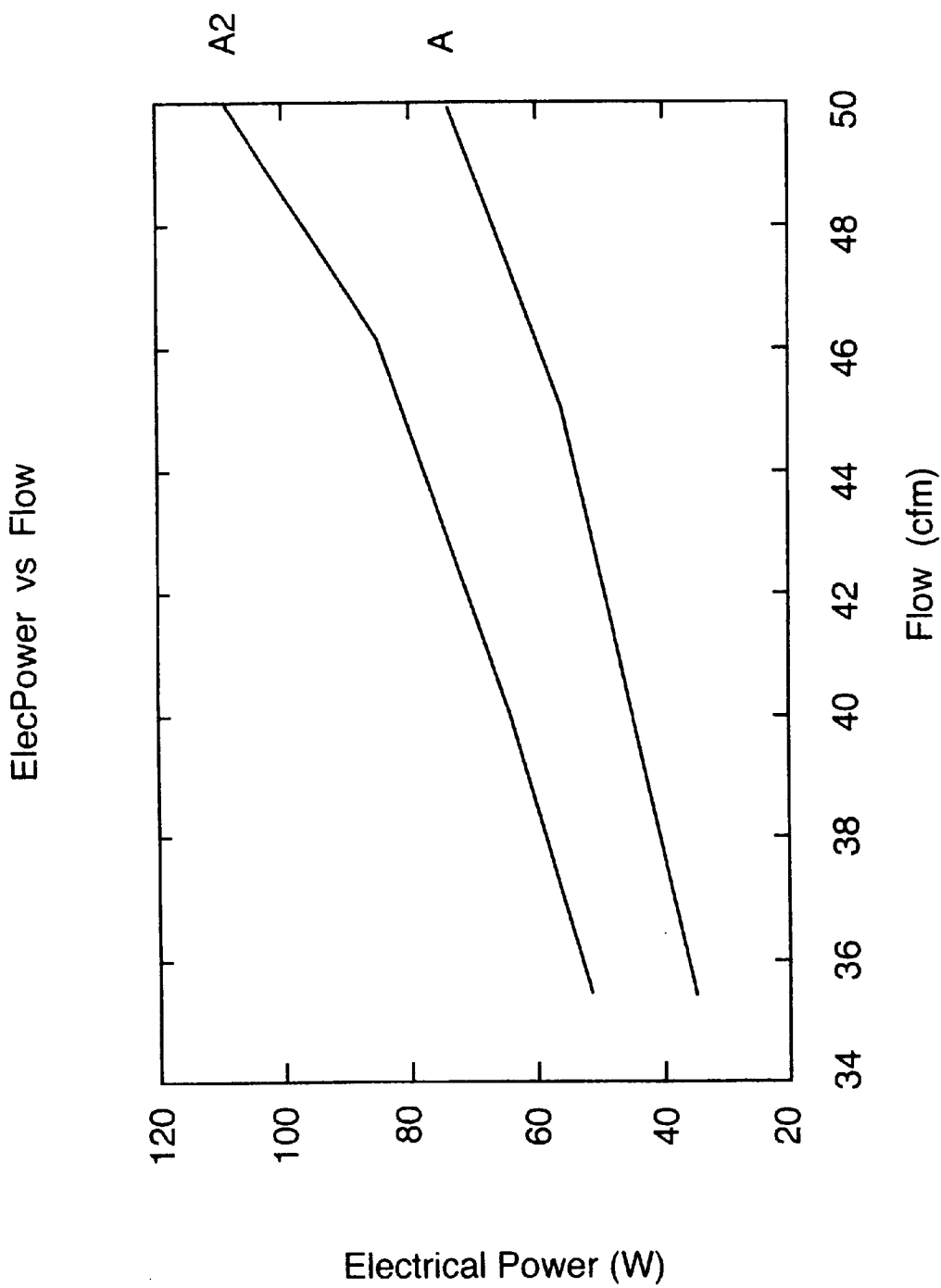
FIG. 10 is a graph of electrical power versus flow for a motor receiving a pulsed signal according to the instant invention.
Figure 12A:
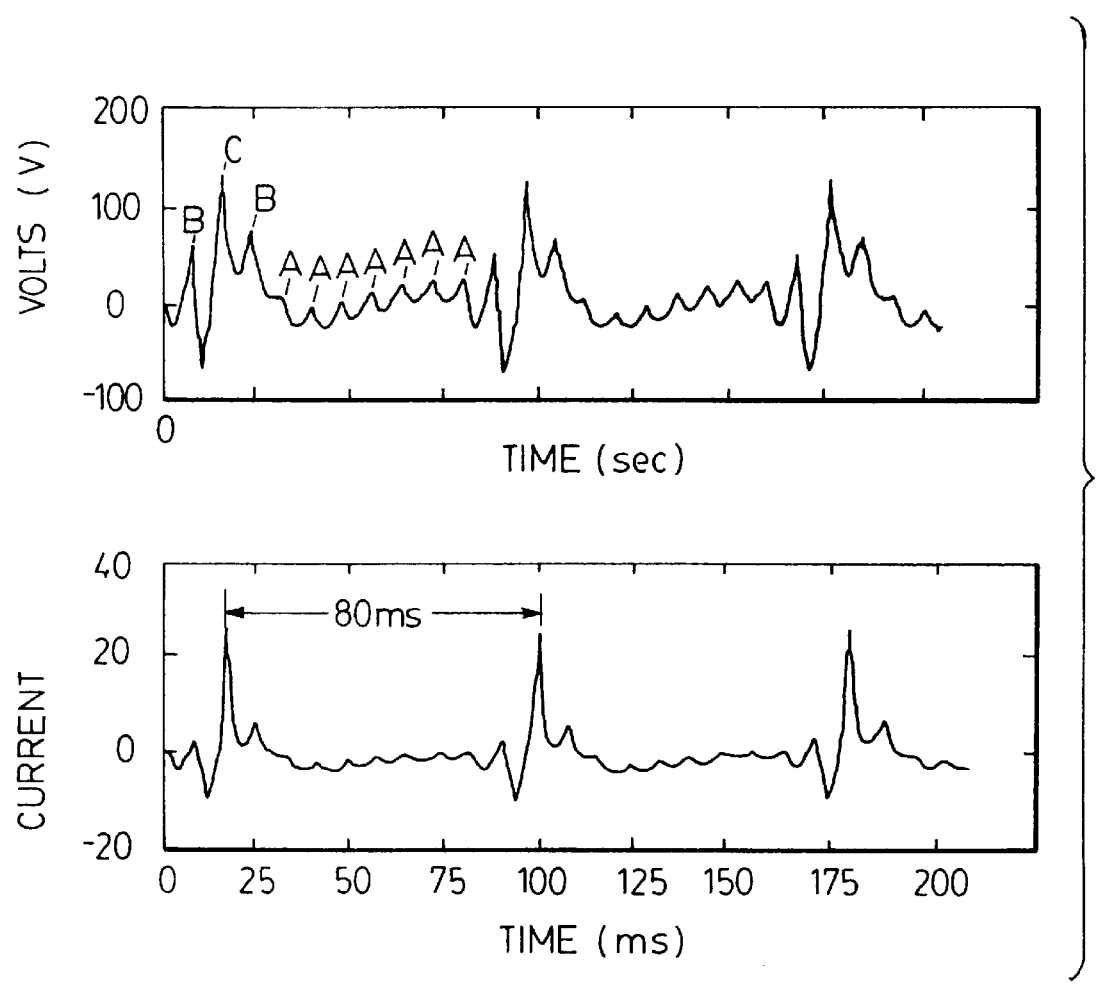
FIGS. 12(a)–(c) are a graph of voltage versus time and a graph of current versus time for a pulse train signal provided to a motor.
Figure 12B:
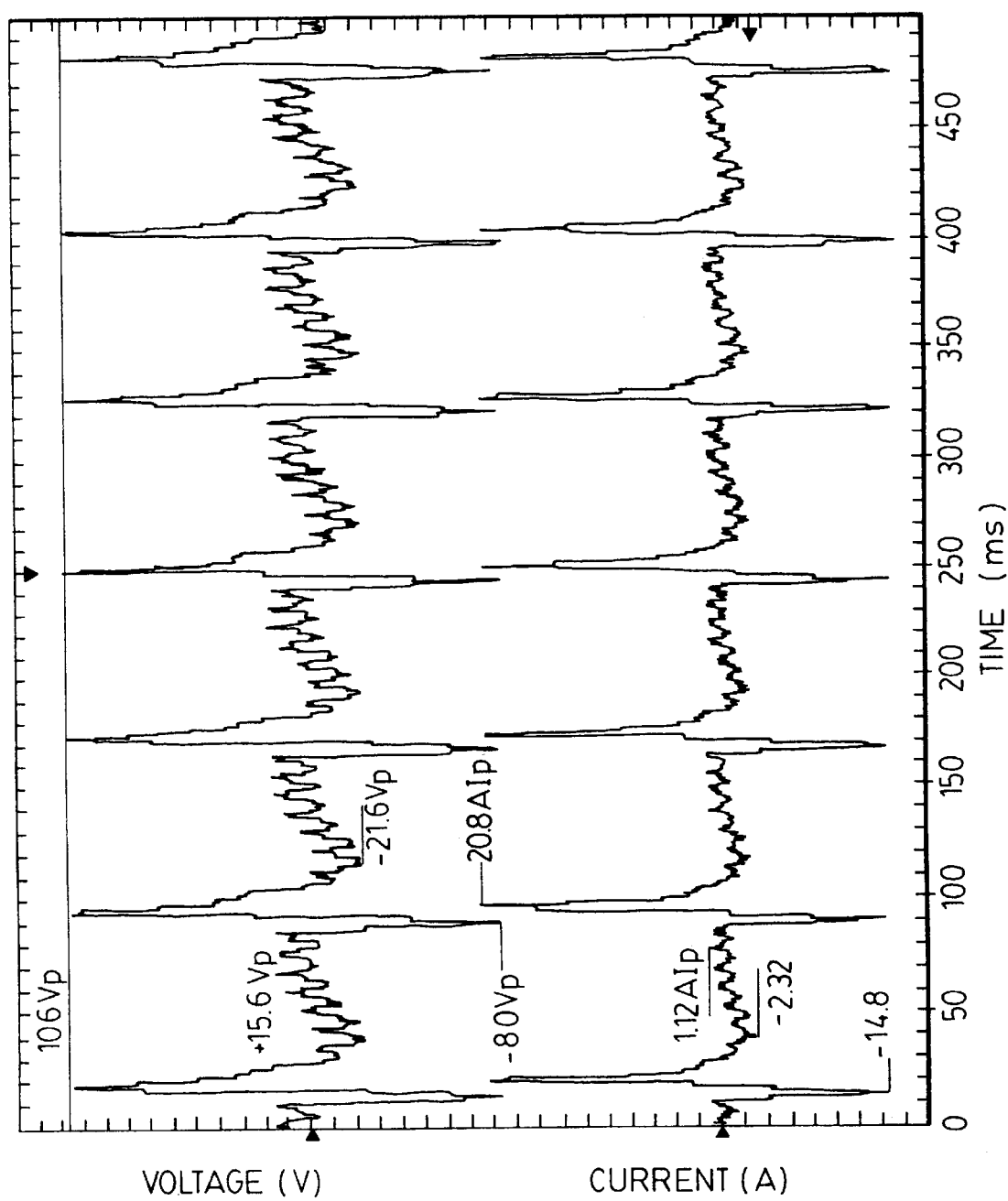
Figure 12C:
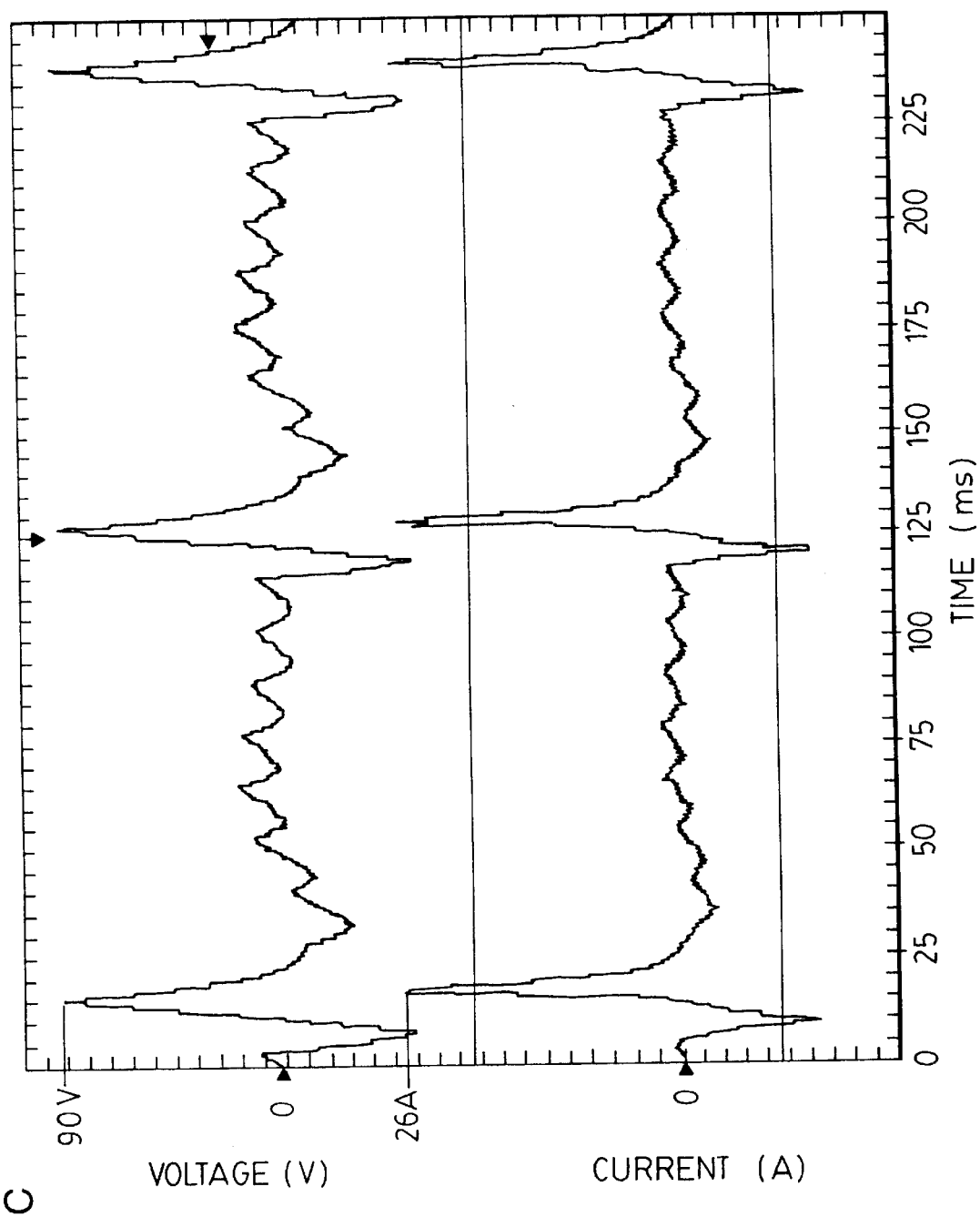

In order to demonstrate the power efficiency available using the power control system of the instant invention, a Panasonic motor model number SDS-25IFF was connected downstream from a cyclone bin similar to that shown in FIG. 5. The air flow rate through the cyclone bin was determined by measuring the pressure drop across the cyclone bin using a manometer. In order to provide a reading of the pressure drop, two pitot tubes were inserted into the air flow path, one upstream of the cyclone bin and the other downstream of the cyclone bin. The pitot tubes provided minimal interaction with the air flow through the air flow conduit. The current and voltage drawn by the motor were measured using a Tektronix A622 AC/DC Current Probe with a frequency response of DC to 100 kHz for up to 100A peak current and a Tektronix P5200 High Voltage Differential Probe. The power was calculated by the equation $P_{elec.ins}(t)=i(t).v(t)$. The results are shown in FIG. 10. In this Figure, the line designated as "A2" provides the electrical power required by the motor at different flow rates when operated on conventional 60 Hz DC power. The line designated "A" is the electrical power required to obtain the same flow rates using the power control system of the instant invention. The signal which is fed to the motor is shown in FIG. 12(a). As shown in FIG. 12(a), the pulse train had a frequency of 12.5 Hz (i.e. each cycle or pulse train had a duration of 80 milliseconds) with 10 pulses per cycle. The strongest pulse (pulse C) had a peak voltage of about 120 volts. The peak pulse was sandwiched between two strong pulses (pulses B) which had a peak voltage of about 60 volts. The remaining pulses (pulses A) had a peak voltage of about 20 volts. Two other signals on which the motor was operated are shown in FIGS. 12(b) and (c). The signal shown in FIG. 12(b) had a peak voltage for pulse A of 106 volts. The pulse train had a frequency of 13 Hz. The signal shown in FIG. 12(c) had a peak voltage for pulse A of 90 volts. The pulse train had a frequency of 9 Hz.

Figure 11:
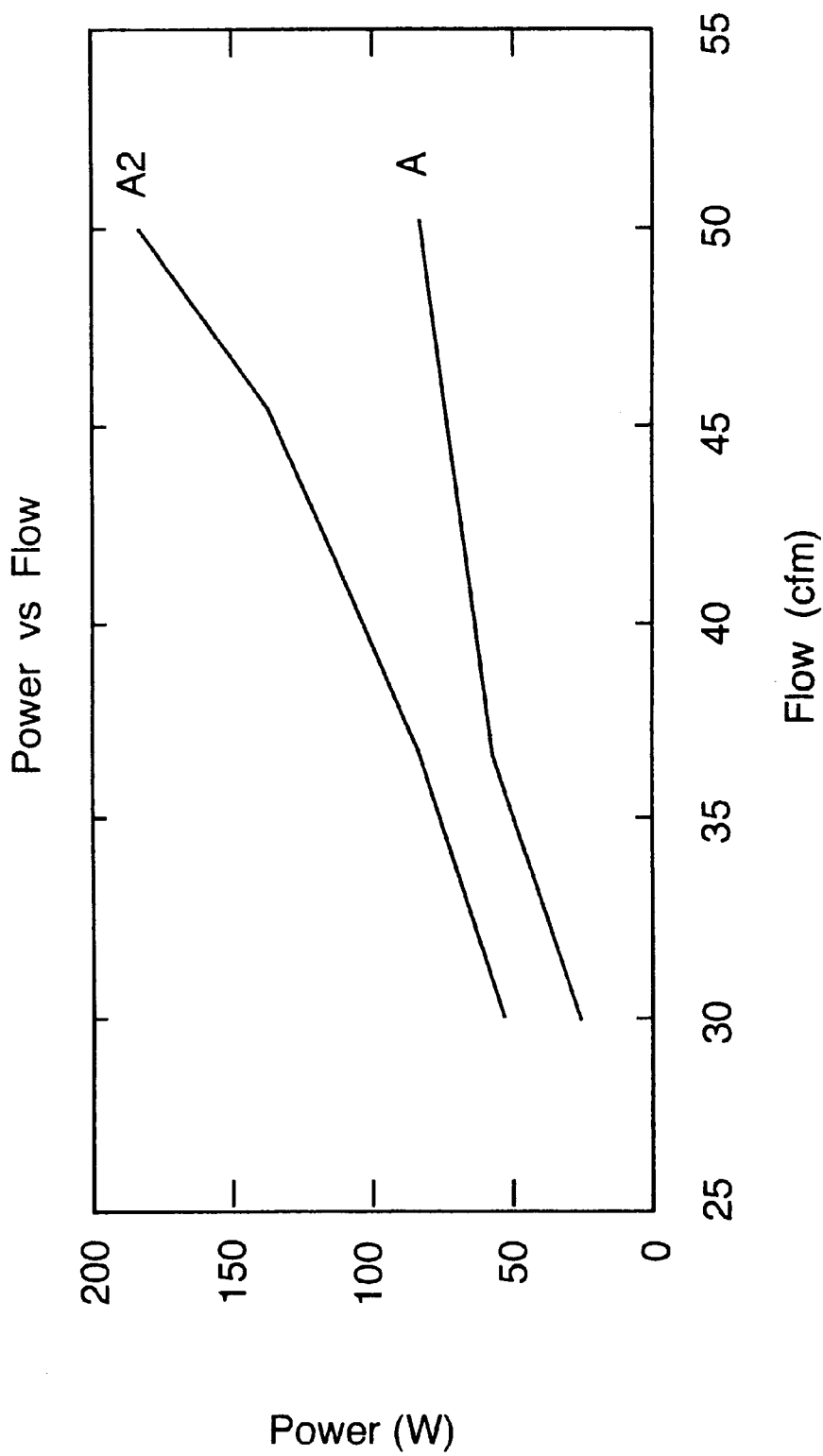
FIG. 11 is a graph of power versus flow for a second motor receiving a pulsed signal according to the instant invention.

A second test was conducted utilizing a custom wound 50 volt test motor which was obtained from Amatek (model number E-11459-2D). The results are set out in FIG. 11. Once again, line "A2" is used to designate the power required when the motor was operated on conventional 60 Hz DC power and line "A" is used for the line representing the power required when the motor was operated using the power control system of the instant invention. In this case, the signal fed to the motor was similar to that fed to the Panasonic motor.

EXAMPLE 2

Figure 13:
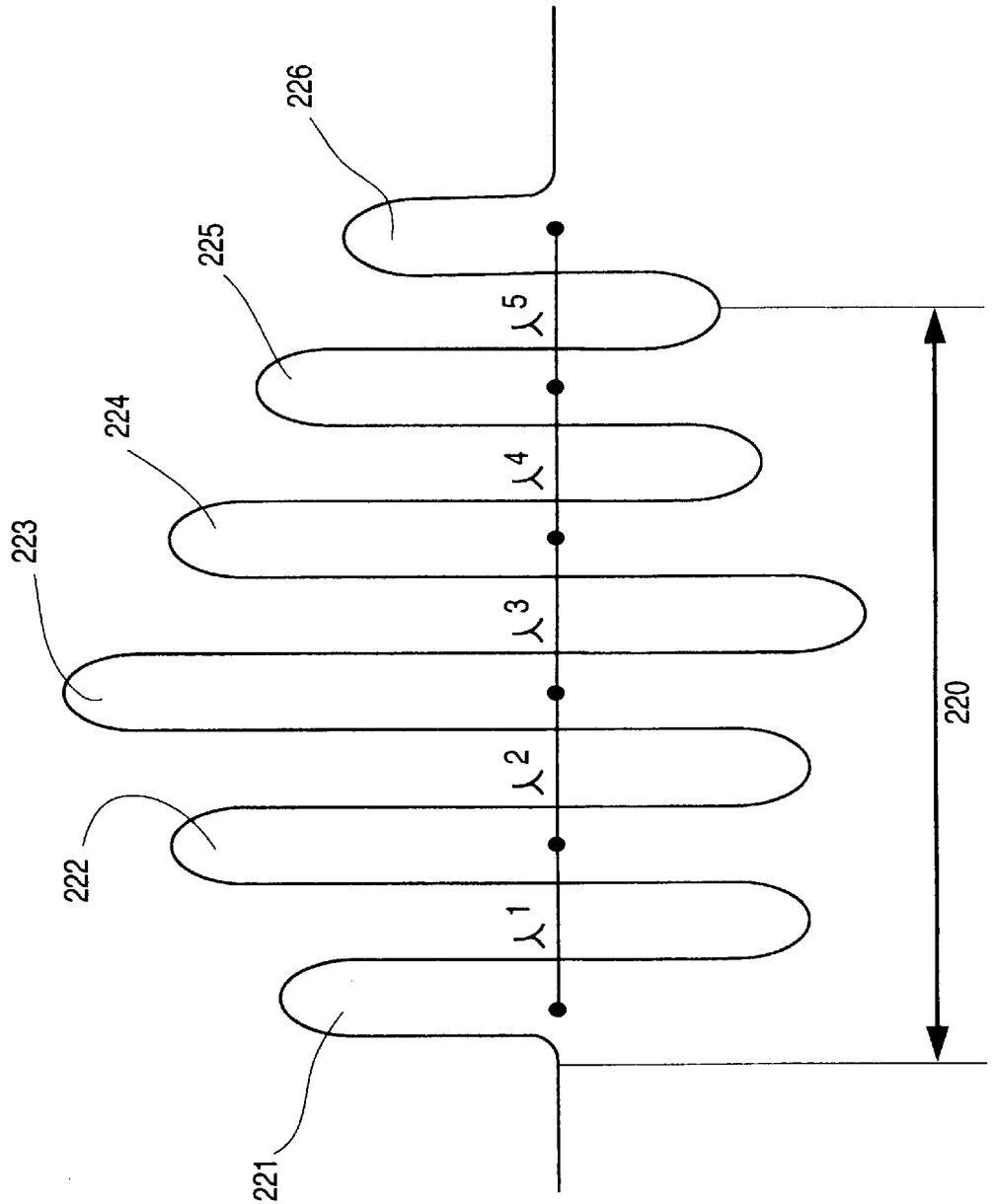
FIG. 13 is a representation of a pulsed signal provided to a light bulb in accordance to the instant invention; and, FIG. 14 is a graph showing the voltage and current for an alternate pulsed signal provided a light bulb.

This Example demonstrates the use of a pulsed train signal with a light bulb. As shown in FIG. 13, a pulse train wherein each period contained five pulses was fed to a light bulb.

Within the period or cycle 220, there are five pulses, indicated at 221, 222, 223, 224, and 225. The pulses are spaced by intervals indicated as $\lambda_1, \lambda_2, \lambda_3, \lambda_4, \lambda_5$. The specific values for these pulses in this example are:

| Pulse No. | Voltage | Duration of Pulse (Pulse Width) | Pulse Interval |
|---|---|---|---|
| 21 | 50 | 10 | $\lambda_1 = 10$ |
| 22 | 55 | 7 | $\lambda_2 = 12$ |
| 23 | 60 | 12 | $\lambda_3 = 8$ |
| 24 | 57 | 9 | $\lambda_4 = 10$ |
| 25 | 48 | 9 | $\lambda_5 = 12$ |

As indicated at the right hand side, at 221', the next period has the same sequence of pulses.

As this table shows, within the period 220, all the parameters of the pulses, namely frequency (i.e. inverse of the pulse interval), pulse width or duration, and pulse height (voltage) are varied. This gives a distinct pulse profile for the period, and this is repeated in following periods. In general, depending on the particular application, it may not be necessary to vary all three parameters, and it may be sufficient to vary just two of them, or even just one of them, with the other(s) being kept constant. Additionally, it will be understood that the absolute magnitude of each of these parameters can vary greatly depending upon the actual application.

It is believed that by selection of suitable parameters, a resonance effect is achieved, causing the filament to provide a significantly larger proportion of the radiation in the visible region. This enables, for example, a normally 40-watt bulb to be driven with significantly less than 40 watts of power, and yet still produce the same amount of visible light.

Figure 14:
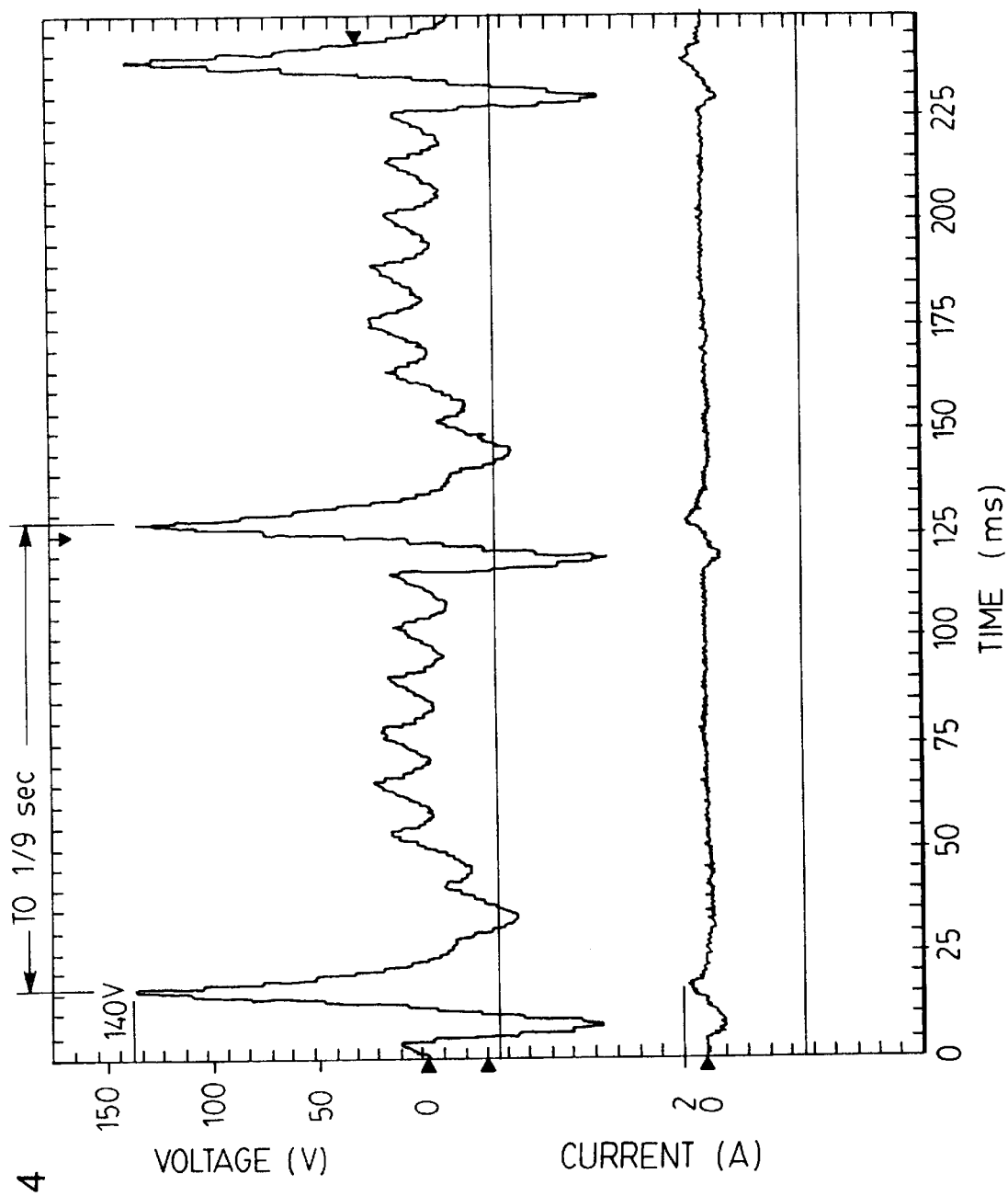

FIG. 14 shows a print out of a pulsed signal which was used for a fluorescent light bulb. As can be seen from FIG. 14, the voltage which was applied to the light bulb was relatively constant. However, the current fluctuated substantially and comprised a signal having 10 pulses per period. Each cycle or period was ⅑ second and the frequency was 9 Hz. A light meter was used to measure the visible light emitted by the light bulb when the light bulb was operated on a standard AC signal and when the light bulb was operated on the signal of FIG. 14. When the signal of FIG. 14 was used, the light bulb emitted the same amount of visible light but consumed 18% less power.

EXAMPLE 3

A pulsed signal comprising ten pulses per period was provided to a secondary battery for recharging the battery. The pulse train was similar to that shown in FIG. 12. In this case, peak voltage "C" was 21 volts, pulse B was 16.5 volts and the remaining pulses (pulses A) had a peak voltage of 14.5 volts. The duration of each pulse was 0.1 seconds. As a result of this pulse train, sub-C batteries were charged at a rate of C/.5 (i.e. they were charged in 30 minutes) without causing any heat damage to the batteries.

I claim:

1. A method of controlling the electrical power applied to a load, the method comprising the steps of:
    (a) producing a pulse train comprising a series of pulses defining a cycle in which a portion of the pulse train having a duration of 10% of the cycle delivers more than 20% of the total power to the load which the load receives each cycle by providing a first electrical signal to the load and periodically superimposing a second signal to the load whereby the load periodically receives a pulse at a higher voltage than the first electrical signal; and,
    (b) supplying the pulse train to the load to supply power to the load.

2. The method as claimed in claim 1 further comprising the step of providing an electric power supply and the pulse train is produced by modulating the electric power supply to produce the pulse train.

3. The method as claimed in claim 1 wherein the portion provides 30–70% of the total power the load receives each second.

4. The method as claimed in claim 1 wherein the portion provides 40–60% of the total power the load receives each second.

5. The method as claimed in claim 1 wherein the portion provides 45–55% of the total power the load receives each second.

6. The method as claimed in claim 1 wherein the cycle has a frequency of 6–20 Hz.

7. The method as claimed in claim 1 wherein the cycle has a frequency of 9–15 Hz.

8. The method as claimed in claim 1 wherein each cycle comprises 1–20 pulses.

9. The method as claimed in claim 1 wherein each cycle comprises 5–15 pulses.

10. The method as claimed in claim 1 wherein the signal is non-uniform.

11. The method as claimed in claim 1 wherein the load comprises a motor and impact member assembly and the pulse train is modulated to vary the acceleration of the impact member to reduce degradation of a Prandtl layer which forms on the impact member as the fluid travels over the impact member.

12. The method as claimed in claim 1 wherein the load comprises a radiation emitting device having a radiation emitting member which emits radiation in a plurality of bands when a uniform electrical signal is provided to the radiation emitting member and the pulse train is modulated to excite electrons to selected quantum states to preferentially produce radiation in a selected spectrum.

13. The method as claimed in claim 1 wherein the load comprises a member selected from the group consisting of a fluorescent light bulb and a sodium lamp and the pulse train is modulated to excite electrons to selected quantum states to preferentially produce light.

14. The method as claimed in claim 1 wherein the load comprises a rechargeable battery in which, during the discharge of the battery, chemical reactions occur that can utilize electrons having differing potentials and during recharging, the chemical reactions are reversed and the pulse train is modulated to preferentially use electrons having a higher potential to reverse chemical reactions requiring higher potential electrons.

15. The method as claimed in claim 1 wherein the load comprises a rechargeable battery in which, during the discharge of the battery, chemical reactions occur that can utilize electrons having differing potentials and during discharging the pulse train is modulated to preferentially use higher potential electrons to provide energy to an external load.

16. The method as claimed in claim 1 wherein the load comprises a motor and fan blade assembly for a vacuum cleaner and the method further comprises the step of using the pulse train to operate the motor and fan blade assembly whereby the motor and fan blade assembly causes air to travel from a dirty air inlet and through filtration means for the vacuum cleaner.

17. The method as claimed in claim 1 wherein the load comprises a motor and fan blade assembly for a vacuum cleaner and the vacuum cleaner has a hose having a first dirty air inlet for above the floor cleaning and a cleaning head having a second dirty air inlet for cleaning a floor and the method further comprises the step of using the pulse train to operate the motor and fan blade assembly whereby the motor and fan blade assembly causes a different flow pattern of air through the hose than through the cleaning head.

18. The method as claimed in claim 1 wherein the load comprises a motor and fan blade assembly for a vacuum cleaner and the vacuum cleaner has a hose having a first dirty air inlet for above the floor cleaning and a cleaning head having a second dirty air inlet for cleaning a floor and the method further comprises the step of using the pulse train to operate the motor and fan blade assembly whereby the motor and fan blade assembly causes a higher flow rate of dirty air through the hose than through the cleaning head.

\* \* \* \* \*